US012375501B2

(12) United States Patent
Vahid et al.

(10) Patent No.: US 12,375,501 B2
(45) Date of Patent: Jul. 29, 2025

(54) ENCRYPTED TRAFFIC OBFUSCATION METHOD AND SYSTEM

(71) Applicants: The Regents of the University of Colorado, a body corporate, Denver, CO (US); The Board of Trustees of the University of Illinois, Urbana, IL (US)

(72) Inventors: Alireza Vahid, Denver, CO (US); Jafar Haadi Jafarian, Denver, CO (US); Amirreza Niakanlahiji, Mountain View, CA (US)

(73) Assignees: The Regents of the University of Colorado, a body corporate, Denver, CO (US); The Board of Trustees of the University of Illinois, Urbana, IL (US)

( * ) Notice: Subject to any disclaimer, the term of this patent is extended or adjusted under 35 U.S.C. 154(b) by 137 days.

(21) Appl. No.: 18/456,657

(22) Filed: Aug. 28, 2023

(65) Prior Publication Data
US 2024/0073221 A1 Feb. 29, 2024

Related U.S. Application Data

(60) Provisional application No. 63/401,414, filed on Aug. 26, 2022.

(51) Int. Cl.
*H04L 9/40* (2022.01)
(52) U.S. Cl.
CPC ...... *H04L 63/1408* (2013.01); *H04L 63/0428* (2013.01)

(58) Field of Classification Search
CPC .............. H04L 63/1408; H04L 63/0428
USPC ........................................... 726/22
See application file for complete search history.

(56) References Cited

U.S. PATENT DOCUMENTS

| | | | |
|---|---|---|---|
| 8,934,487 B2 * | 1/2015 | Vogt | H04L 63/0407 709/224 |
| 9,942,247 B2 * | 4/2018 | Seul | H04L 63/0428 |
| 10,326,798 B2 * | 6/2019 | Lambert | H04L 63/18 |
| 11,895,036 B2 * | 2/2024 | Lin | H04L 47/196 |

* cited by examiner

*Primary Examiner* — Amare F Tabor
(74) *Attorney, Agent, or Firm* — Meunier Carlin & Curfman LLC

(57) ABSTRACT

A system and methods to obfuscate encrypted data packets from traffic analysis attacks are disclosed. At a high level, a processing device: executes an application or protocol for receiving traffic associated with the application or protocol; selects an obfuscation interval duration for a next transmission of a data packet; determines, at the obfuscation interval duration, if a queue for transmission of a next data packet associated with the application or protocol is: i) empty, or ii) has a next data packet associated with an application or protocol; and transmits, based on the determination, at least one of: i) a length-adjusted next encrypted data packet, or ii) an encrypted obfuscation data packet. In The transmitted length-adjusted encrypted next data packet can be generated using the next data packet and is adjusted in length with an obfuscation payload prior to encryption and subsequent transmission.

20 Claims, 12 Drawing Sheets

ENCRYPTED TRAFFIC OBFUSCATION METHOD AND SYSTEM

CROSS-REFERENCE TO RELATED APPLICATIONS

This application claims the benefit of and priority to U.S. Provisional Patent Application No. 63/401,414, filed Aug. 26, 2022, which is incorporated herein by reference in its entirety.

BACKGROUND

Domain Name System (DNS) is a distributed naming service on the Internet, allowing systems to resolve other systems' IP addresses by their domain names. DNS has played an essential role on the Internet since its introduction in 1985; however, it was designed in an era when information security was not a primary concern. As such, it is a binary protocol that does not have any built-in security features to protect it from on-path eavesdroppers. With no encryption in place, it is straightforward for an on-path eavesdropper to determine the web pages visited by the user of a machine, even if the whole web traffic is encrypted or is not observable (e.g., the web traffic proxied through the TOR network).

To address this increasing concern regarding the privacy of users, several standards such as DNS-over-HTTPS (DoH), DNS-over-TLS (DoT), and DNS-over-QUIC (DoC) have been proposed to encrypt DNS traffic on the Internet. The DoH protocol, in particular, is used to address users' privacy concerns regarding on-path adversaries, including local Internet service providers (ISPs), who can observe DNS traffic to learn web browsing activities even when the web traffic is not observable, such as when proxied through the Tor network. To achieve this goal, in DoH, DNS traffic between a DNS client and its local DNS resolver is channeled through an encrypted Hypertext Transfer Protocol Secure (HTTPS) tunnel.

However, adversaries can still infer users' web browsing activities from encrypted DoH traffic (as well as other encrypted traffic) through machine-learning-based and deep-learning-based traffic analysis (TA) attacks that rely on unencryptable features in the DNS footprint of a website, including query/response lengths and counts, and delays between subsequent queries (timing), to identify which website is being visited. To defend against such TA attacks, existing DoH clients and resolvers can pad DNS queries and responses with null bytes to certain block sizes before encrypting them as recommended in RFC 8467.

SUMMARY

An exemplary encrypted-traffic obfuscation method and system is disclosed for a client-side obfuscation operation that can defeat traffic-analysis (TA) attacks on encrypted traffic (e.g., the DNS footprint of websites). The exemplary encrypted-traffic obfuscation method and system employ a combination of (1) compression-aware padding, (2) fake query injection, and (3) random delaying of queries to obfuscate query/response lengths, counts, and timings.

One implementation of the present disclosure is a system that includes: a processor (hardware or software); and a memory operatively coupled to the processor, the memory having instructions stored thereon for traffic obfuscation of encrypted data packets associated with an application or protocol, wherein execution of the instructions by the processor, cause the processor to: select an obfuscation interval duration (e.g., uniformly sampled random duration) for a next transmission of a data packet (e.g., DNS query) associated with an application or protocol; at the obfuscation interval duration, determine if a queue for transmission of a next data packet associated with the application or protocol is at least one of i) empty or ii) has a next data packet (e.g., real DNS query) associated with an application or protocol; based on the determination, transmit i) a length-adjusted next encrypted data packet associated with an application or protocol or ii) an encrypted obfuscation data packet (e.g., fake DNS query) associated with an application or protocol, wherein the transmitted length-adjusted encrypted next data packet associated with the application or protocol is generated using the next data packet and is adjusted in length with an obfuscation payload (e.g., string of heterogenous encoded characters (e.g., ASCII characters including nulls)) prior to encryption and subsequent transmission.

In some implementations, execution of the instructions by the processor further cause the processor to, prior to the transmission of the length-adjusted encrypted next data packet, adjust the next data packet in length with the obfuscation payload to produce a length-adjusted next data packet; and encrypt the length-adjusted next data packet to produce the length-adjusted encrypted next data packet.

In some implementations, execution of the instructions by the processor, further cause the processor to, prior to transmission of the length-adjusted encrypted next data packet, adjust the next data packet in length with the obfuscation payload to a standardized data packet length (e.g., closest multiple of 128) associated with the application or protocol to produce a length-adjusted next data packet; and encrypt the length-adjusted next data packet to produce the length-adjusted encrypted next data packet.

In some implementations, the length-adjusted next data packet includes an indicator (e.g., a value or symbol) of the length of the obfuscation payload.

In some implementations, the obfuscation payload includes a string of heterogenous encoded characters (e.g., ASCII characters including nulls).

In some implementations, execution of the instructions by the processor, further cause the processor to generate the encrypted obfuscation data packet by: selecting a payload from a set of candidate payloads; generating an obfuscation data packet associated with the application or protocol using the selected payload; adjusting the obfuscation data packet in length with a second obfuscation payload to produce a length adjusted obfuscation data packet; and encrypting the length adjusted obfuscation data packet to generate the encrypted obfuscation data packet.

In some implementations, the length adjusted obfuscation data packet includes an indicator (e.g., a value or symbol) of the length of the second obfuscation payload.

In some implementations, the second obfuscation payload includes a string of heterogenous encoded characters (e.g., ASCII characters including nulls).

In some implementations, the transmission of the length-adjusted next encrypted data packet or the encrypted obfuscation data packet after a selected delay of the obfuscation interval duration provides obfuscation of length and timestamp of an encrypted data packet associated with the next data packet (e.g., to prevent traffic analysis attacks).

In some implementations, the application or protocol is selected from the group consisting of a DNS-over-HTTPS (DoH) protocol; and a high-frequency trading application.

In some implementations, the instructions for traffic obfuscation of encrypted data packets are a part of a browser, a browser add-on, or a computer application.

In some implementations, the system includes a router or network device or an ISP network equipment.

Another implementation of the present disclosure is a system including a processor and a memory operatively coupled to the processor, the memory having instructions stored thereon for traffic obfuscation of encrypted data packets associated with an application or protocol, wherein execution of the instructions by the processor, cause the processor to: receive an encrypted data packet associated with an application or protocol; decrypt the encrypted data packet to determine a payload of the data packet; determine the decrypted payload is an obfuscation payload and ignore the payload; determine the decrypted payload is a real payload and remove an obfuscation payload from the decrypted payload; and service the real payload.

Yet another implementation of the present disclosure is a method for obfuscating encrypted data packets from traffic analysis attacks (a DNS-over-HTTPS (DoH) protocol, high-frequency trading application, etc.) (e.g., at a browser, a browser add-on, a computer application, a router or network device, or an ISP network equipment) including: executing, by a processor, an application or protocol or receiving traffic associated with the application or protocol; selecting, by a processor, an obfuscation interval duration (e.g., uniformly sampled random duration) for a next transmission of a data packet (e.g., DNS query) associated with the application or protocol; at the obfuscation interval duration, determining, by the processor, if a queue for transmission of a next data packet associated with the application or protocol is at least one of i) empty or ii) has a next data packet (e.g., real DNS query) associated with an application or protocol; based on the determination, transmitting, by the processor, i) a length-adjusted next encrypted data packet associated with an application or protocol or ii) an encrypted obfuscation data packet (e.g., fake DNS query) associated with an application or protocol, wherein the transmitted length-adjusted encrypted next data packet associated with the application or protocol is generated using the next data packet and is adjusted in length with an obfuscation payload (e.g., string of heterogenous encoded characters (e.g., ASCII characters including nulls)) prior to encryption and subsequent transmission.

In some implementations, the method further includes prior to the transmission of the length-adjusted encrypted next data packet, adjusting, by the processor, the next data packet in length (e.g., to a standardized data packet length (e.g., closest multiple of 128)) with the obfuscation payload (e.g., a string of heterogenous encoded characters (e.g., ASCII characters including nulls)) to produce a length-adjusted next data packet (e.g., wherein the length-adjusted next data packet includes an indicator (e.g., a value or symbol) of the length of the obfuscation payload); and encrypting the length-adjusted next data packet to produce the length-adjusted encrypted next data packet.

In some implementations, the method includes generating the encrypted obfuscation data packet by selecting a payload from a set of candidate payloads; generating an obfuscation data packet associated with the application or protocol using the selected payload; adjusting the obfuscation data packet in length with a second obfuscation payload to produce a length adjusted obfuscation data packet; and encrypting the length adjusted obfuscation data packet to generate the encrypted obfuscation data packet.

In some implementations, the method further includes receiving, by a second processor of a second computing device, the length-adjusted next encrypted data packet associated with an application or protocol; decrypting, by the second processor, the length-adjusted next encrypted data packet associated with an application or protocol to determine a decrypted payload; determining, by the second processor, i) the decrypted payload is an obfuscation payload and ignore the payload or ii) the decrypted payload is a real payload and removing the obfuscation payload from the decrypted payload, wherein the decrypted payload is serviced by the application or protocol.

In some implementations, the method is used to obfuscate encrypted data packets in a DNS-over-HTTPS (DoH) protocol or in a high-frequency trading application.

Yet another implementation of the present disclosure is a method to evaluate traffic obfuscation of encrypted data packets including: building an adversarial traffic analysis tool by performing traffic analysis on encrypted traffic (e.g., DNS traffic) (e.g., detecting websites being browsed by users) using a machine-learned classifier (e.g., Random Forest classifier); wherein the adversarial traffic analysis tool is used to identify informative features from a set of candidate features to perform a traffic analysis attack.

In some implementations, the set of candidate features includes one or more features selected from the group consisting of: length-based features (e.g., query length, response lengths); timing-based features (e.g., transmission time, interval between consecutive queries, interval between consecutive responses, interval between a response and an adjacent query, interval between a query and an adjacent response); count-based features (e.g., total number of queries, total number of responses, number of consecutive (uninterrupted) queries before a response, number of consecutive (uninterrupted) responses before a query); length and timing-based features (e.g., ratio of cumulative bytes sent over bytes received, time to first N bytes); and timing and count-based features (e.g., number of queries per second, number of responses per second).

Yet another implementation of the present disclosure is a non-transitory computer readable medium having instructions stored thereon that, when executed by a processor, cause a device to perform any of the above-discussed methods.

Figure 1:
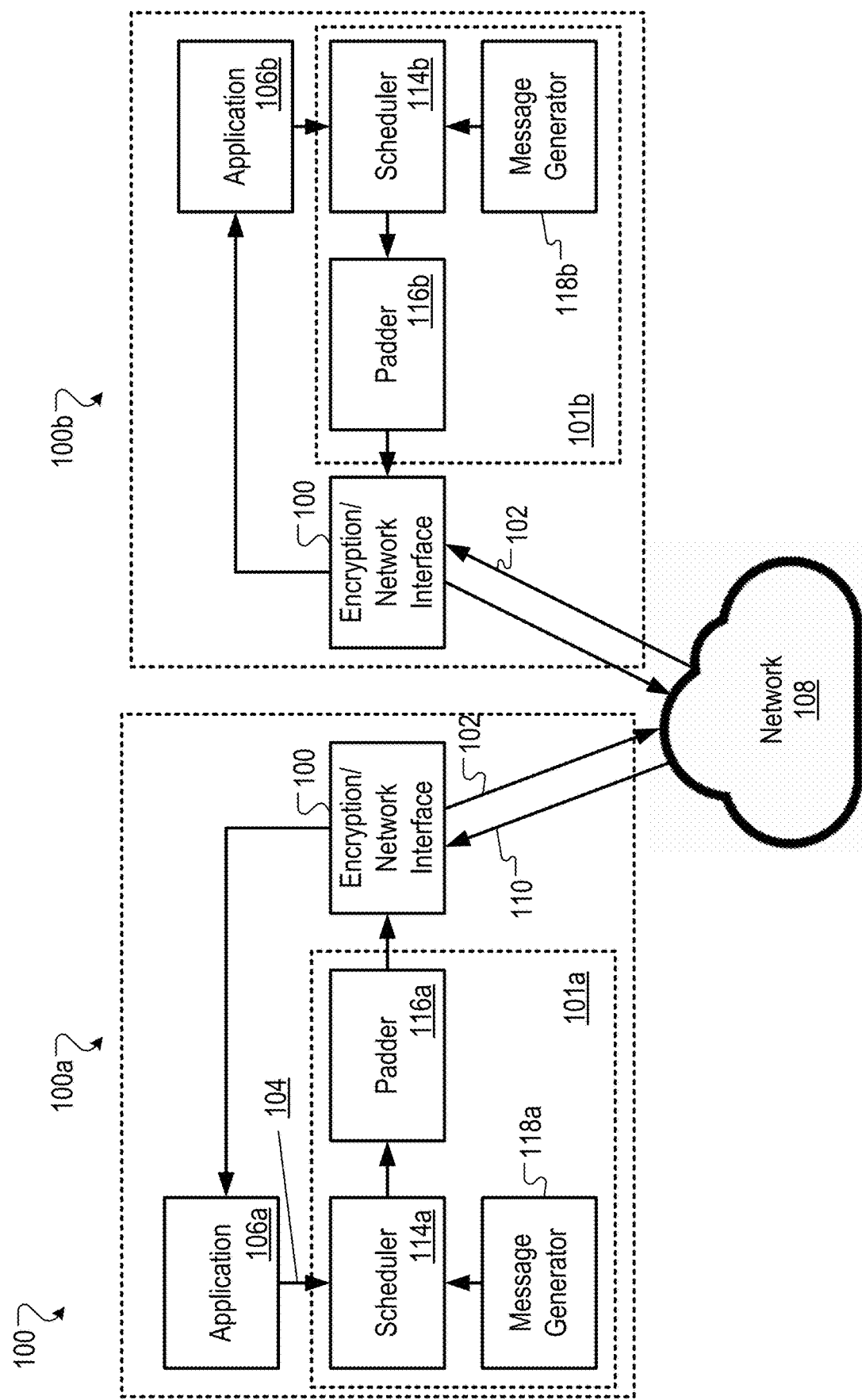
FIG. 1 is a block diagram of an encrypted-traffic obfuscation system, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, systems and methods for encrypted traffic obfuscation are shown, according to various implementations. In at least one aspect, a client-side obfuscation approach to defeat TA attacks on the DNS footprint of websites is disclosed. Using a combination of (1) compression-aware padding, (2) fake query injection, and (3) random delaying of queries, the obfuscation techniques described herein obfuscate query/response lengths, counts, and timings. Notably, the disclosed obfuscation techniques do not require changes to existing protocols and can be incrementally deployed on client machines as a local proxy. Using a robust classifier with a comprehensive set of over 150 features derived from proposed TA attacks on encrypted DNS traffic and experimenting with the Cloudflare and Google resolvers and 200 target websites, the present disclosure demonstrates that, while with the existing padding-only obfuscation, the TA attacker can achieve over 95.58% accuracy, the obfuscation techniques described herein can degrade this accuracy to below 9% with reasonable overhead.

System and Methods of Operation

Referring first to FIG. 1, an example encrypted-traffic obfuscation system 100 is shown, in accordance with an illustrative implementation. In particular, system 100 is shown to include two subsystems 100a, 100b, communicably coupled via a network 108. For the purposes of the following description, subsystem 100a may be considered a source or "transmitting" system and subsystem 100b may be considered a recipient; however, these designations are not intended to be limiting. As shown, each of subsystems 100a, 100b includes an obfuscation module—respectively shown as obfuscation modules 101a, 101b— configured to generate an obfuscated message 102 from a message 104 generated by an application or protocol (shown as applications 106a, 106b) and to transmit the obfuscated message 102 over network 108 to a recipient. For example, subsystem 100a may generate an obfuscated message to be sent to subsystem 100b, or vice versa. In this regard, subsystems 100a, 100b can also be configured, in some implementations, to receive an obfuscated message 110 generated by other computer devices (e.g., the other one of subsystems 100a, 100b) connected via network 108.

In some implementations, obfuscation modules 101a, 101b are identical to one another. In some implementations, obfuscation modules 101a, 101b are configured to comply with a standard as set by a governing body (e.g., standard body such as IETF, IEEE, etc.) to be operable. In some implementations, obfuscation modules 101a, 101b obfuscate a message by adding a random time delay to an encrypted message, e.g., to be sent by subsystem 100a, 100b, respectively. In some implementations, obfuscation modules 101a, 101b obfuscate a message by adding an obfuscation payload to the message's payload. In some implementations, obfuscation modules 101a, 101b generate an obfuscation message (e.g., a fake message) to be transmitted to a recipient (e.g., subsystem 100b). In FIG. 1, obfuscation modules 101a, 101b are further shown to include respective schedulers 114a, 114b, padders 116a, 116b, and message generators 118a, 118b.

Schedulers 114a, 114b are generally configured to maintain a queue for a given message (e.g., a data packet such as a DNS query) to be transmitted. The queue may receive the message from the application or protocol (e.g., applications 106a, 106b). Schedulers 114a, 114b may then add a random time delay to the message, if there is one, or may select an obfuscation message generated by a respective one of message generators 118a, 118b. Schedulers 114a, 114b are configured to send a next message (i.e., a next application data packet or an obfuscation message) to respective one of padders 116a, 116b.

Padders 116a, 116b are generally configured to introduce an obfuscation string including a plurality of heterogenous encoded characters (e.g., ASCII characters including nulls) to generate a length-adjusted message. The obfuscation string is concatenated, in some implementations, at the beginning or end of the message. Padders 116a, 116b then send the length-adjusted message to an encryption a respective network interface module—shown as network interface modules 120a, 120b— to be transmitted to a recipient (e.g., subsystem 102b).

Message generators 118a, 118b are generally configured to generate an obfuscation message that mimics the message generated by the application or protocol (e.g., applications 106a, 106b) and/or that has statistical variations from the message generated by the application or protocol (e.g., applications 106a, 106b). In some implementations, the desired statistical variation can be achieved by having a non-null string.

It should be appreciated that FIG. 1 shows just one example implementation of obfuscation modules 101a, 101b. In some alternative implementations, message generators 118a, 118b can be configured to generate an encrypted string that can be passed through to a respective one of network interface modules 120a, 120b. In some implementations, padders 116a, 116b are configured to introduce an encrypted string that is concatenated to the message and an encryption module (e.g., network interface modules 120a, 120b) can encrypt only the message portion of that message. Other implementations may be used to add random time delays to a length-adjusted encrypted message and to transmit obfuscation messages.

Referring now to FIGS. 2A-2D, in combination with FIG. 1, various different example implementations of an obfuscation module for use in system 100 are shown, according to various implementations. Specifically, the variations of different obfuscation module configurations—which may be considered variations or alternatives of obfuscation modules 101a and/or 101b, as described above—are shown as obfuscation modules 101c, 101d, 101e, and 101f, respectively. However, it should be appreciated that other configurations of an obfuscation module are also contemplated herein.

Figure 2A:
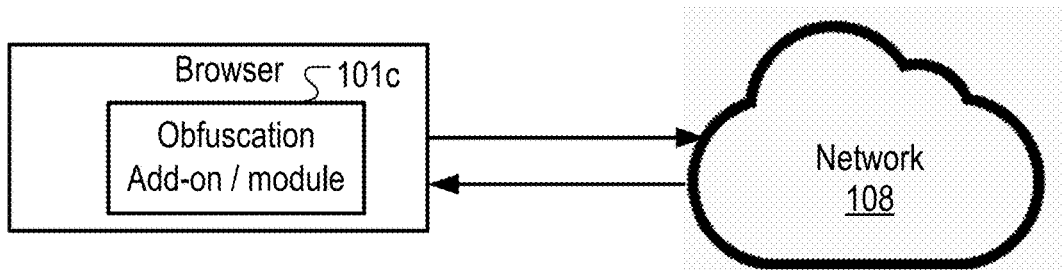
FIGS. 2A-2D are block diagrams of various configurations of an obfuscation module, according to some implementations.
Figure 2B:
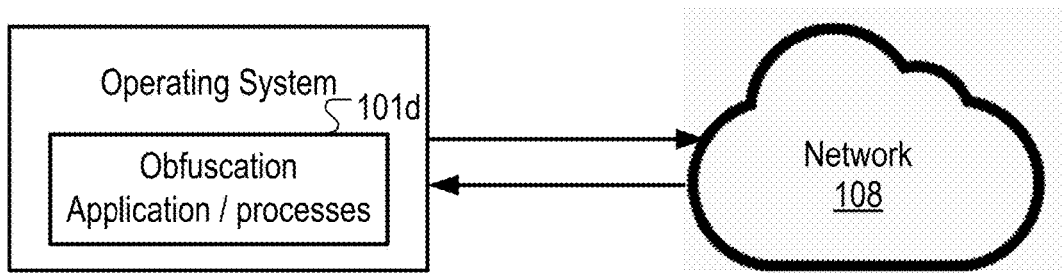
Figure 2C:
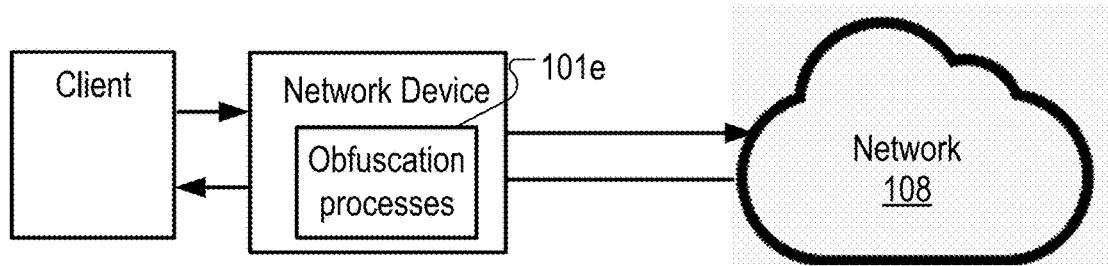
Figure 2D:
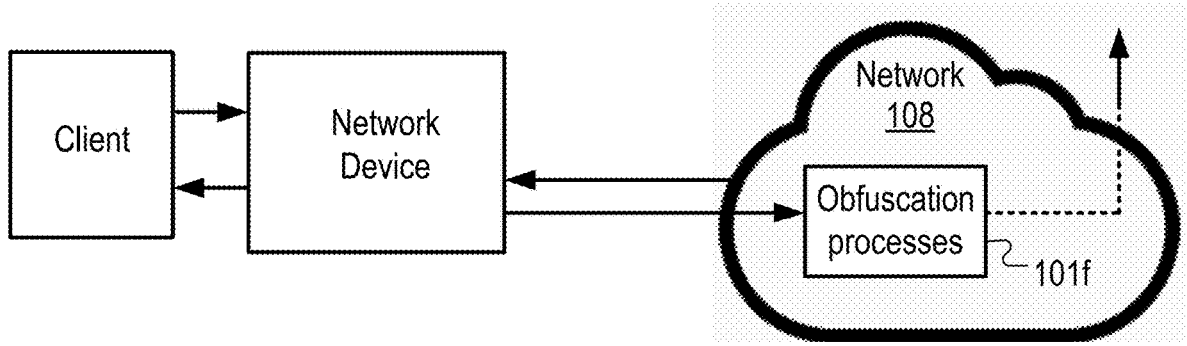

In FIG. 2A, obfuscation module 101c is shown to be implemented as an add-on component or module for a web browser; thus, obfuscation module 101c may be used to obfuscate web traffic (e.g., DNS queries). In FIG. 2B, obfuscation module 101d is shown to be implemented as an application or process executing in an operating system; thus, obfuscation module 101d may be used to obfuscate any network traffic (e.g., web traffic, as well as voice, video, as well as other data). In FIG. 2C, obfuscation module 101e is shown to be implemented as a process executing on a network device (e.g., router); thus, obfuscation module 101e may be used to obfuscate any network traffic received by the router. In FIG. 2D, obfuscation module 101f is shown to be implemented as a network infrastructure; thus, obfuscation module 101f may be used to obfuscate any network traffic received by the network infrastructure.

Example Method of Operation

Figure 3:
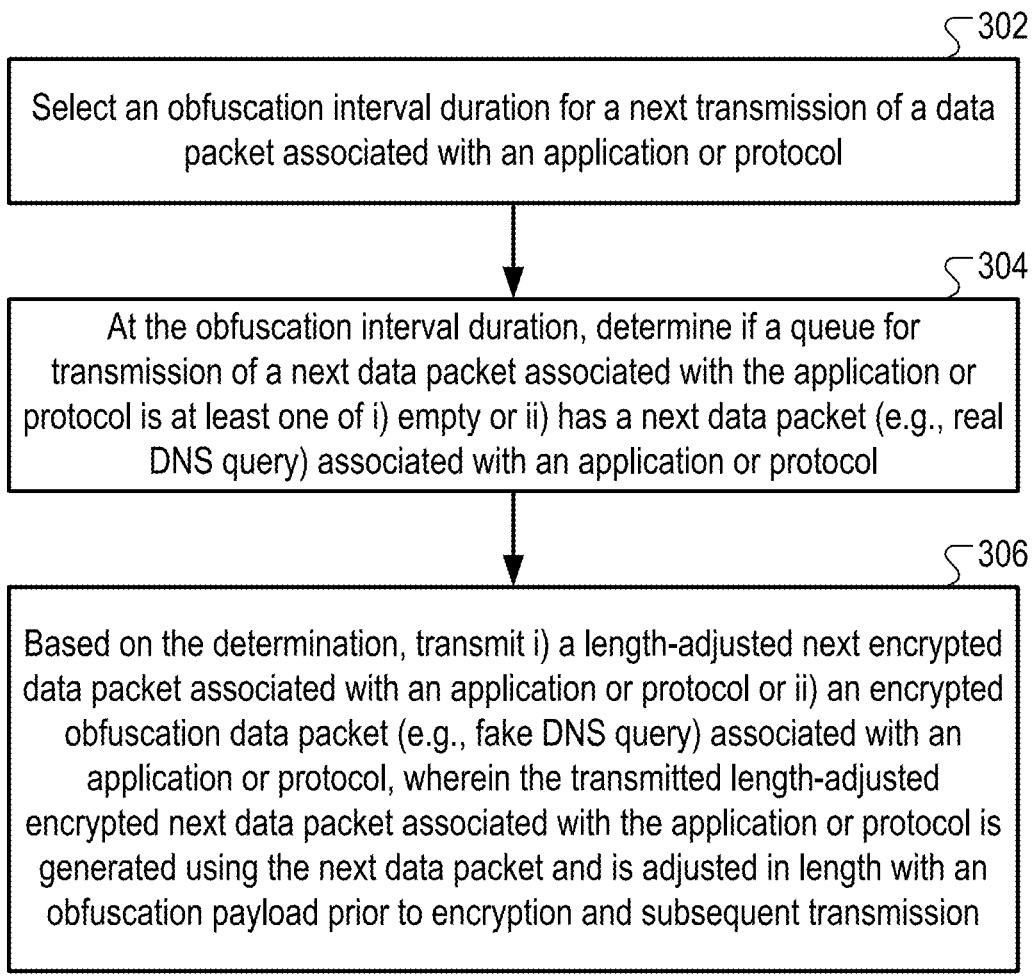
FIG. 3 is a flow chart of a method of performing traffic obfuscation of an encrypted data packets, according to some implementations.

Referring now to FIG. 3, an example method 300 of performing traffic obfuscation of an encrypted data packet associated with an application or protocol is shown, in accordance with an illustrative implementation. As described herein, method 300 may be a computer-implemented process. In particular, in some implementations, method 300 is implemented by system 100, as described above. It will be appreciated that certain steps of method 300 may be optional, and, in some implementations, method 300 may be implemented using less than all of the steps. It will also be appreciated that the order of steps shown in FIG. 3 is not intended to be limiting.

At step 302, an obfuscation interval duration for a next transmission of a data packet (e.g., a DNS query) associated with an application or protocol is selected. In some implementations, the obfuscation interval duration is generated by a random number generator configured to provide a uniformly sampled random duration between a provided time. The duration may be assessed, e.g., experimentally, according to a distribution of transmission of the messages, e.g., according to methods as described herein. In one example, for a DNS query message, the duration may be uniformly generated between 62 and 188 milliseconds.

At step 304, it is determined whether a queue for transmission of a next data packet associated with the application or protocol is at least one of: i) empty, or ii) has a next data packet (e.g., real DNS query) associated with an application or protocol. This determination may be made at the obfuscation interval duration selected at step 302.

At step 306, at least one of: i) a length-adjusted next encrypted data packet associated with an application or protocol or ii) an encrypted obfuscation data packet (e.g., fake DNS query) associated with an application or protocol is transmitted based on the determination made at step 304. The transmitted length-adjusted encrypted next data packet associated with the application or protocol may be generated using the next data packet and is adjusted in length with an obfuscation payload (e.g., string of heterogenous encoded characters (e.g., ASCII characters including nulls)) prior to encryption and subsequent transmission.

DNS Traffic Obfuscation

Figure 4:
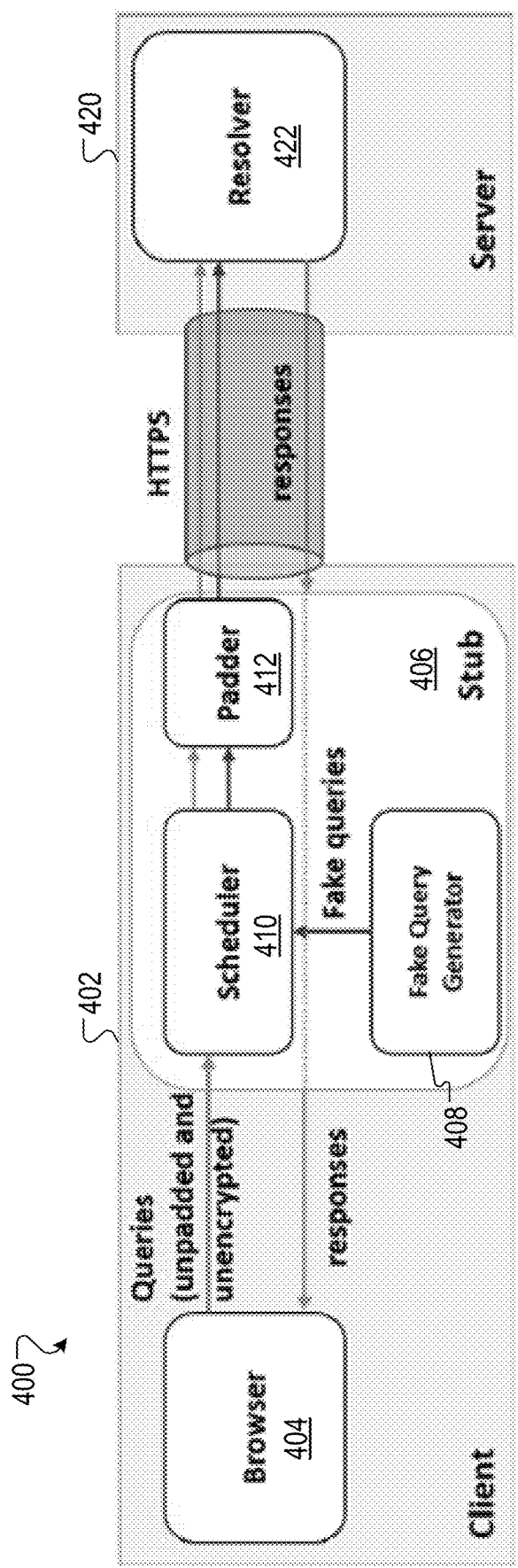
FIG. 4 is a block diagram of the architecture of a DNS traffic obfuscation methodology, according to some implementations.
Figure 5:
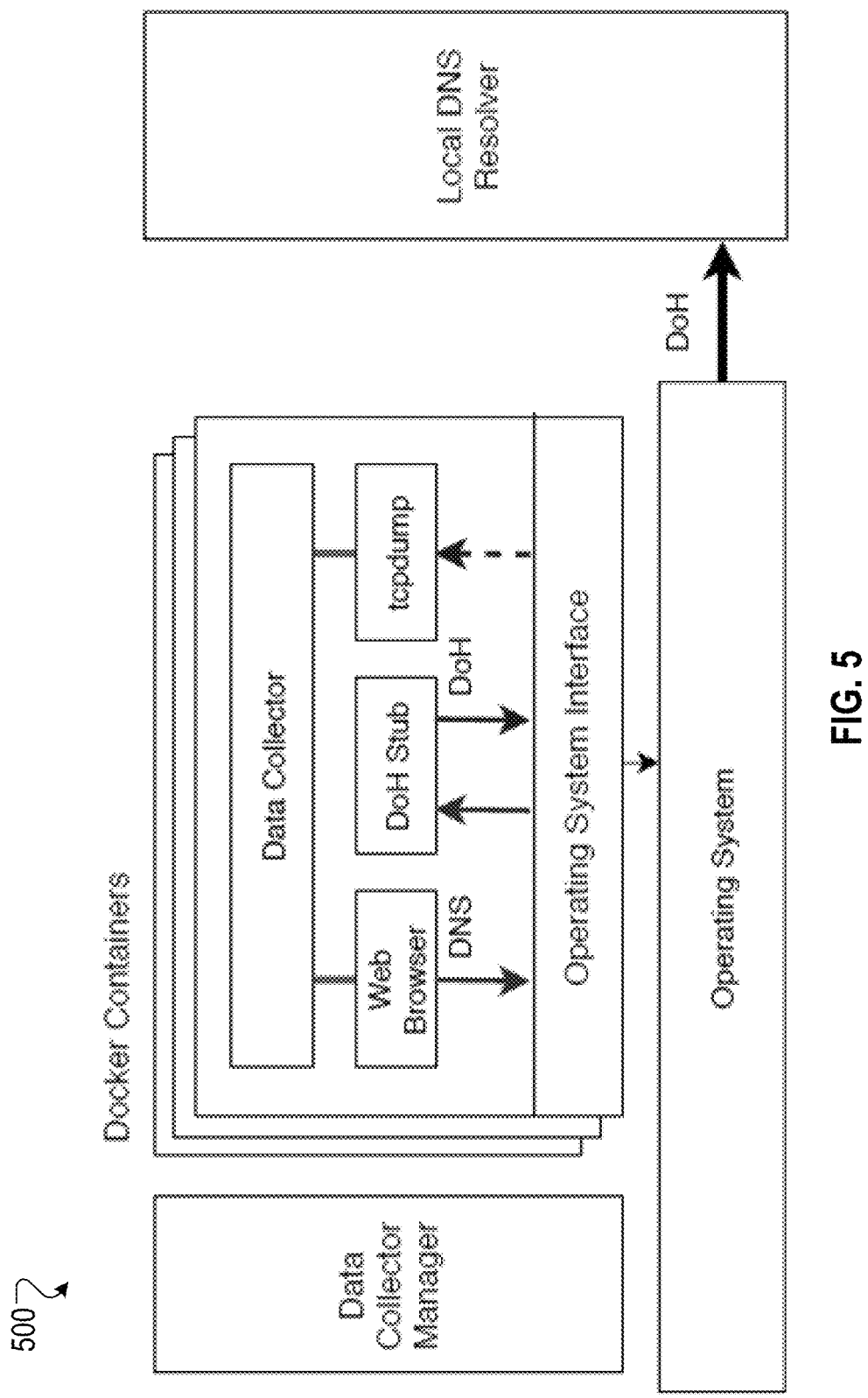
FIG. 5 is a block diagram of an experimental data collection system, according to some implementations.

Referring now to FIGS. 4 and 5, in general, an example DNS traffic obfuscation method and systems are shown, according to some implementation. Generally, it should be appreciated that the following description of FIGS. 4 and 5 may be best understood in conjunction with the preceding description of FIGS. 1-3. FIG. 4, in particular, shows an example architecture of a traffic obfuscation system 400 configured to perform DNS traffic obfuscation. Notably, system 400 is highly efficient in implementation and introduces minimum intrusiveness in an existing environment for a single client machine. System 400 can be deployed without imposing any protocol change or introducing new functionality to either a Web client or server applications. In this regard, a DNS traffic obfuscator may be implemented as a standalone proxy that resides on a client system.

The network configuration of a client system 402 is updated to deliver all DNS traffic to this proxy instead of the local DNS resolver. The proxy includes three modules, in this example part of a stub resolver shown as stub 406, including a packet extender 412 ("Padder"), a fake DNS query generator 408 ("Fake Query Generator/message generator"), and a query scheduler 410 ("Scheduler"). A browser 404 (or other services that need DNS service) may issue the queries to a local DNS resolver (e.g., a public DNS resolver such as Cloudflare (1.1.1.1) or Google (8.8.8.8)). In the example, these queries (at this point, still unpadded and unencrypted) are forwarded to stub 406 that is running locally (e.g., on client system 402). These requests are received by query scheduler 410 and added to a queue. Query scheduler 410 sends out a query, for example, every 125 ms on average, but the interval length is chosen randomly from the range 62 to 188 milliseconds. When ready to forward a query, if there is a real query in the queue, query scheduler 410 sends out that query. If the queue of real queries is empty, query scheduler 410 will send a fake query that was previously generated by fake DNS query generator 408.

For both real and fake queries, the forwarded query by query scheduler 410 is first sent to packet extender 412. Packet extender 412 may pad the DNS queries to the currently used specification of 128 bytes per block, e.g., per RFC 8467. Stub 406 then forwards the real and fake queries to a local DNS resolver 422 (e.g., Cloudflare or Google, in this example) operating on a server 422 via an encrypted HTTPS channel. The process may be completely transparent to the DNS resolver. When stub 406 receives the response from local DNS resolver 422, stub 406 may forward that response back to the original requester, which in this example can be browser 404. Stub 406 may transmit responses for all real and fake queries.

The exemplary system facilitates the obfuscation (e.g., by stub 406) of the DNS footprint of any service, including various browsers (e.g., browser 404), on an individual client machine. However, other alternative architectures are also possible for providing obfuscation as a network-based service or application-specific service. As a network-based service, stub 406 could also be implemented as a network proxy that provides obfuscation services to many clients. In this architecture, the stub proxy will intercept all outbound DNS queries from network machines and add necessary obfuscation (delays, fake queries, random pads) before Forwarding them to the DNS resolver. Also, the exemplary system may be deployed in an application-specific architecture. For example, the exemplary system can be deployed within a specific browser, such as Chrome, to only obfuscate the DNS footprints of websites loaded by the browser.

Padding: The exemplary DNS traffic obfuscation system improves upon prior padding operations. The standard approach for traffic obfuscation is to obfuscate plaintext lengths by extending the plaintexts with null byte padding before encryption. Different padding techniques for DNS packets have been proposed and standardized over the years, including random padding, linear padding, exponential padding, mice-element padding, and maximum padding (also called quantization or Pad-to-MTU). For DNS traffic obfuscation, the EDNS(0) padding option standard introduced in RFC 7830 and refined in RFC 8467 allows DNS clients and servers to pad request and response messages with a variable number of octets. The current recommendation for DoH is for a client to pad to a block length of 128 using null bytes and for a server to pad responses to a block length of 468 (again using null bytes) in accordance with RFC 8467. However, only using null-byte padding for traffic obfuscation is fundamentally flawed for two reasons.

First, while padding techniques can obfuscate query/response lengths, they cannot obfuscate count-based and timing-based features. Therefore, even assuming that such padding obfuscates all query/response lengths ideally, TA techniques can still use count-based and timing-based features to conduct a highly accurate classification. More insidiously, since the query/response data are padded with null bytes, the HTTP2 compression (or TLS compression, if enabled) will compress shorter queries/responses more than larger ones because the shorter ones have more repetition of the null character. This leaks information about the original packet length, which nullifies the obfuscation effect of padding to a certain extent.

Distribution morphing (through padding and splitting): The exemplary DNS traffic obfuscation system also improves upon prior distribution morphing. Approaches have been proposed for a different but related threat model of classifying Web traffic by morphing the distribution of packet lengths into a pre-defined target distribution by chopping and padding them. These approaches, while being more effective than pure padding for obfuscation of packet lengths and counts, fail to effectively obfuscate many features of the traffic, including total data lengths transmitted in each direction (e.g., FS1-1 and FS1-2 as later discussed herein), total transmission time (FS2-1 as later discussed herein), as well as the bursts in the data (FS1-3 as later discussed herein).

Injection of dummy packets: The exemplary DNS traffic obfuscation system improves upon other systems by injecting dummy packets (fake data) in addition to padding packets. For example, some may consider the least requirement for effective obfuscation of encrypted Web traffic entails quantization of all packet lengths while ensuring that all flows have the same durations and total sizes through injection of dummy packets. Achieving such obfuscation in practice is challenging because, without a careful configuration, it could even benefit the adversary. For example, when all flows are prolonged to have a minimum transmission time, if this minimum is not sufficiently large to accommodate all flows, then flows with durations longer than the minimum threshold would become very distinguishable. While insightful, only theoretical frameworks primarily focused on obfuscation of Web traffic and considering a limited number of features have been proposed in the past which are neither applicable nor generalizable to encrypted DNS traffic.

Several research works have shown the effectiveness of tree-based classifiers, especially Random Forests for traffic analysis. In some cases, statistical classifiers can outperform deep learning classifiers in the analysis of encrypted TLS traffic and only outperform them in network applications with non-stationary noise conditions (e.g., Tor) where statistical models become unreliable. Moreover, prior research has also shown that the effectiveness of traffic analysis methods depends more on the set of used features rather than the classifier type. The exemplary encrypted-traffic obfuscation method and system address limitations of existing standards and proposed obfuscation techniques for traffic obfuscation for DNS traffic as well as other traffic types (HTTP). In general, existing countermeasures against TA attacks only obfuscate some features of the traffic while leaking others. Without a solution that comprehensively obfuscates all conceivable features of the traffic, TA attacks can rely on the leaked features to classify flows with sufficient accuracy. Specifically, for DoH traffic obfuscation, the standard null-byte padding practices are in no way adequate. Moreover, DNS traffic obfuscation has not been previously investigated beyond this standard null-byte padding, which is shown to be ineffective against traffic analysis attacks.

Example DNS Traffic Obfuscation Algorithm

Example pseudo-code of a DNS footprint obfuscation algorithm as described herein is shown below as "Algorithm 1". In some implementations, Algorithm 1 is executed on a local stub (e.g., stub 406). The DNS queries issued by the browser may be forwarded to the stub, and as they arrive, they are added to a queue called query_queue.

Algorithm 1 - Stub's obfuscation algorithm

```
while true do
    δ= rand(62,188)
    Wait for δms
    if query_queue_= ∅ then
        query = dequeue (query _ queue)
    else
        i = rand(0, | fake _ list|) query = fake _ list[ i ]
    end if
    padded_ query = add_pad (query)
    send (padded_ query )
end while
```

The stub sends out a DNS query (either real or fake) at random intervals. In some implementations, the stub selects a random interval duration, δ, which is uniformly sampled from the range 62 to 188 milliseconds. The interval may be chosen such that the average interval duration is around 125 ms (e.g., as determined through experimental data). The stub waits for 6 milliseconds, then checks whether a real query from the browser exists in the queue. If so, the stub forwards the real query; otherwise, it sends a random query. To generate the random query, the stub may first select a random domain name from a list of domain names. For example, a list may include popular website or applications (e.g., top Alexa domains) and then generates the corresponding DNS request as per RFC1035.

Before sending the query to the resolver, the stub may pad any (real or fake) query to the currently used specification of 128 bytes per block as per RFC 8467. However, rather than padding with null bytes, the padded string is a string of random characters generated by concatenating random domain names until the total length of query and padding becomes the closest multiple of 128. The stub continues the process of sending real or fake queries at random intervals in an infinite loop and for as long as the stub process is running.

Experimentation and Results

For the purposes of this disclosure, a possible threat model for the attacker is as follows. First, it was assumed that the data collection for training the classifier and then for the website fingerprinting (testing) are conducted from the same network and system to minimize the impact of glitches and arbitrary network behaviors on the classification accuracy. Second, it was assumed that during both training and fingerprinting (attack), only one user is actively working with the system, and only one website is being visited by the user at any time. Thirdly, it was assumed that the targeted website during fingerprinting is among the set of websites on which the classifier is trained. Relaxing any of these assumptions only complicates traffic analysis for the attacker and results in a weaker threat model than the one considered here.

With this threat model in place, a robust classifier was developed that we will use for investigating the efficacy of our obfuscation technique. To ensure generalizability of the results, the classifier uses a comprehensive set of features, which have been identified through holistic and systemic investigation and categorization of all features proposed in the literature for analysis of encrypted DNS traffic.

A Random Forest classifier was used to build adversarial traffic analysis methods and a study was conducted in a real environment using a stub configured with an obfuscation module. The stub (e.g., stub 406) was configured to provide service to all the application processes running on a client machine. The stub added all the receiving DNS queries in a queue and sent them out one by one (i.e., in a sequence). Performing traffic analysis on such an intermingled DNS sequence was much more complicated than the case where the stub only receives DNS queries from one source. To show the strength of an example implementation of the exemplary approach and also being able to compare with existing traffic analysis works, the study set up the testing environment in a way that the stub only receives DNS queries corresponding to a single webpage. Moreover, in a real environment, the stub never stops sending out DNS queries (either real or fake queries); thus, an on-path attacker does not know when the process of resolving names for a source begins or ends, which also makes traffic analysis significantly more challenging. In the study, the stub was initiated right before visiting a webpage, and it was allowed to collect packets for not more than 30 seconds, which is the maximum recorded time for completing all resolutions of a webpage in the experiments and also aligns with the statistics reported by European ISP.

For the target group, the study selected 300 top websites from Alexa Top sites after filtering out localized versions of domains (e.g., example.com and example.us). Regarding the tested recursive resolvers, the study employed Google and Cloudflare, which are among the most used public resolvers. Two adversarial traffic analysis scenarios were considered: multi-class classification and binary classification.

Scenario I—Multi-class classification: In the first attack scenario, the goal in the study was for the attacker to perform a multi-class classification on the collected DoH footprint of a browsed website homepage and identify the website from the list of 300 target websites by analyzing its DoH footprint.

Scenario II—Binary Classification: In this scenario, the goal in the study was for the attacker to do a binary classification in which they wanted to identify whether a specific website (from the 300 target websites) had been being visited (one vs. all).

For both scenarios, the study considered two sets of features for classification: a Random Forest classifier using 153 features generated for the study and a Random Forest classifier using a subset of these features that include the top ten most informative features for identifying individual webpages from DNS-over-TLS traffic as identified in the work of Houser et al. "An investigation on information leakage of DNS over TLS," In Proceedings of the 15th International Conference on Emerging Networking Experiments And Technologies. 123-137. By including the 10-feature classifier, it can be shown that while a set of features could perform ideally against a certain obfuscation technique (baseline null-byte padding in this example), new layers of obfuscation could significantly reduce the impact of those features. However, this can encourage traffic analysts to rely on a different set of features that are not impacted by the deployed obfuscation.

The study evaluated these two scenarios against four different obfuscation approaches, referred to herein as a baseline, intermediary approach #1, intermediary approach #2, and final approach. Table 1 provides a summary of different obfuscation approaches.

TABLE 1

| Obfuscation Approach | Description |
| --- | --- |
| (1) Baseline (null-byte padding only) | this approach is a standard obfuscation technique implemented on prevalent DNS resolvers, per RFC 8467 [37]. |
| (2) Intermediary approach 1 (null-constant) | this approach is a variation of the obfuscation technique that uses null-byte padding, fake queries, and forwards queries at fixed constant intervals. |
| (3) Intermediary approach 2 (random-constant) | this approach is a variation of the obfuscation technique that still uses fake queries and fixed-interval forwarding but uses random-byte padding instead of null-byte padding. |
| (4) Final approach (random-random) | the main obfuscation technique which still uses random-byte padding and fake queries but forwards queries at random intervals. |

To collect the data, the study used 64 Docker images that ran several captures in parallel. All images ran the same code to ensure no bias or differences in the data collection, but each image was launched with different configuration parameters. Each of the four approaches was executed by the 16 Docker images in parallel (8 running the algorithm against Cloudflare and the other 8 against Google) to capture traces of the 300 websites every 2 hours. FIG. 5 shows the experimental setup 500 for data collection. The DoH was implemented on top of Facebook's experimental DoH Proxy. Data Collection Manager script was responsible for launching each of the containers and performing the following tasks: (1) ran a tcpdump process to listen to encrypted DNS traffic between the host and the designated DNS resolver; and (2) started the stub resolver; the stub runs one of the four approaches based on the provided parameters.

The Data Collection Manager script then (3) used Python Selenium, which opened a headless Chrome browser (e.g., Chrome v85) and loaded the website homepage for 30 seconds. As the page was being loaded, the DNS queries were forwarded to the stub; the stub obfuscated the traffic and forwarded queries to the designated DNS resolver, and also forwarded responses back to the browser. The Data Collection Manager script then (4) after the Chrome browser timed out, closed the tcpdump and saved the results to the host's filesystem. Several rounds of data collection have been conducted since early 2020 at different geographical locations (residential, academic). The study used the first few curated datasets while experimenting with variations of the developed approach to develop better intuitions and also to ensure that the observations and results were independent of the clients' locations and the data collection time. The study observed consistent results across different times and locations. The last dataset, based on which the current results were computed, was collected in a 14-day period a network located in the United States (ASN 16***(anonymized for submission)). It consisted of about 252 k traces representing 158 traces for each of 300 target webpages in 8 different configurations (4 approaches and 2 DoH resolvers). The study trained the classifiers on this dataset and evaluated their accuracy levels based on a 10-fold cross-validation approach.

Example Threat Model. In the study, attackers were assumed to be able to only sniff the DNS traffic originated from the target system and destined to its local DNS resolver and cannot collect web traffic or observe established connections. In other words, attackers have access to a network link between the target system and the local DNS server that allows them to eavesdrop on the entire DNS traffic between these systems. Thus, the attacker does not have access to the target system nor the local DNS resolver.

The attackers perform traffic analysis on the encrypted DNS traffic to detect the websites being browsed by the users. A webpage visit results in a time-sequence of DNS query and response packets. Since the whole DNS traffic is encrypted with the DoH protocol, the plaintext DNS queries and responses are not accessible by attackers. However, the metadata, such as length, timestamp, and traffic direction are still exposed, giving enough information to attackers to potentially conclude the destination webpage being visited.

Assumption of Characteristics of Ideal Obfuscation. In the study, it was assumed that visiting webpage results in a sequence of DNS queries and responses. Assume C= $\{c_1, \ldots, c_k\}$ define the universe of webpages. The study defined a trace $f_x=\{p_1, \ldots, p_n\}$ for $c_x \in C$ where each $p_i$ denotes a transmitted DoH packet while browsing $c_x$. Each $p_i$ denotes a tuple of the form $(t_i, s_i, d_i)$ where $t_i$ shows the timestamp, $s_i$ denotes the Query/Response length, and $d_i \in \{\uparrow/\downarrow\}$ shows the direction of the transmission. Given that a webpage usually combines content from many different origins, one webpage visit usually yields a varying number of DNS requests and responses with different $t_i$, $l_i$, and $d_i$ (note that $d_i=\uparrow$ denotes the client sent the packet to the DNS resolver as a part of DNS queries, and $d_i=\downarrow$ denotes the DNS resolver sent the packet to the client as a part of DNS responses).

Assumption of Accuracy in Ideal Obfuscation. In the study, it was assumed that the objective of a generic traffic analysis technique is to build a classification model that given f, it assigns f to a class $cx \in C$ with an accuracy in the range (1/k, 1) where k is the number of classes, and therefore 1/k denotes the random guess probability. Clearly, the closer the accuracy gets to 1, the better the results.

Ideally, the objective of traffic obfuscation (TO) is to transform a flow of the form $f=\{p_1, \ldots, p_n\}$ into an obfuscated flow $g=\{p'_1, \ldots, p'_m\}$ such that any traffic analysis technique cannot yield an accuracy higher (and also lower) than 1/k (random guess probability) independent of the set of targeted webpages, used features, or classifier type. From a practical perspective, the more an obfuscation technique reduces the accuracy of a robust DoH-based classifier, the better the obfuscation technique; if the accuracy reaches 1/k, the obfuscation can be assumed to be ideal.

Study of Feature Importance in Ideal Obfuscation. In machine learning, feature importance can be used to estimate the influence or informativeness of a given input feature to the prediction made by a model [27]. Feature importance may be calculated via various feature importance estimators for different classifiers. For Random Forest classifiers (e.g., for use in an adversarial traffic analysis), Mean Decrease in impurity (MDI) and Mean Decrease in Accuracy (MDA) are the two most used estimators to this aim. Irrespective of the used estimator, the feature importance weights essentially define a probability distribution over the set of features, as the sum of all weights is equal to 1.

To compare two obfuscation approaches A and B, the study trained a classifier with a fixed set of features on traffic generated once when A is in place (CA) and another time when B is in place (CB) and compare the accuracy of the resulted classification models. If the accuracy of CA is lower than CB, then the importance of its features is expectedly closer to the uniform distribution than of features in CB. In the ideal obfuscation case where the accuracy of traffic classifiers drops to 1lk (k is the number of classes), no features would be more informative than others; i.e., all features have the same importance. In other words, when the accuracy of a classifier that is using n features reaches 1/k (random guess probability), every feature would have a weight (probability) of 1/n.

In order to understand how this ideal obfuscation could be achieved, the study first identifies and enumerates various classes of features that a generic DoH-based traffic analysis classifier could derive from DoH traces.

Study of Features for DNS Traffic Analysis. The study generated features for DNS traffic analysis. For every DoH trace of the form $f=\{p_1, \ldots, p_n\}$, three types of data are leaked: query/response lengths, timings, and counts. The study used features that could be built for traffic analysis that uses a combination of these different types of data and generated in a total of 7 classes ($\mathcal{P}(\{length, timing, count\})-\phi$). The study defined seven classes of features based on these three data types: (1) length-based, (2) timing-based, (3) count-based, (4) length and timing-based, (5) timing and count-based, (6) length and count-based, and (7) length, timing and count-based.

The study further breaks down this categorization to also include the direction of the data. Essentially, for each class, the study can have a set of features that are calculated based on only queries, only responses, or both queries and responses. To ensure the comprehensiveness of the evaluation, in addition to defining several new features, the study surveyed existing features used in encrypted DNS traffic analysis. As a result, the study identified a list of 153 features to be used for adversarial traffic analysis. Next, the study introduced these features and also categorized them based on the seven classes defined above. The study also determined whether the feature is based on queries, responses, or both.

Table 2 provides a list of the features classes and features used in the study.

TABLE 2

| Feature Classes | Features and Description |
| --- | --- |
| (1) Length-based Features: Features only based on query/response lengths. | FS1-1 (queries). Query lengths: This set of features is calculated based on the lengths (in bytes) of TLS records carrying DNS queries. The maximum, median, mean, minimum, sum, and deciles of the query lengths in a trace are used as features (15 features).<br>FS1-2 (responses). Response lengths: These features are calculated based on the lengths (in bytes) of TLS records carrying DNS responses. The maximum median, mean, minimum, sum, and deciles of the response lengths in a trace are used as features (15 features).<br>FS1-3 (both queries and responses). Cumulative bytes: denotes the cumulative bytes sent and received at each point a packet is captured. The maximum, median, mean, and deciles of these values are used as features (13 features). |
| (2) Timing-based features: features only based on query/response timings. | FS2-1 (both). Transmission time: the interval duration between the first and last transmitted packets is used as a feature (1 feature).<br>FS2-2 (queries). The interval between two consecutive queries: the max, min, mean, median, and deciles of the interval duration between two consecutive queries are used as features (14 features).<br>FS2-3 (responses). The interval between two consecutive responses: the max, min, mean, median, and deciles of the Interval duration between two consecutive responses are used as features (14 features).<br>FS2-4 (both). The interval between a response and its next adjacent query: the max, min, mean, median, and deciles of the interval duration between two consecutive responses are used as features (14 features).<br>FS2-5 (both). The interval between a query and its next adjacent response: the max, min, mean, median, and quantiles of the Interval duration between two consecutive responses are used as features (14 features). |
| (3) Count-based features: Features only based on query/response counts. | FS3-1 (queries). Total number of queries (1 feature).<br>FS3-2 (responses). The total number of responses (1 feature).<br>FS3-3 (both). The number of consecutive (uninterrupted) queries before a response: the max, median, and mean of these numbers are used as features (3 features).<br>FS3-4 (both). The number of consecutive (uninterrupted) responses before a query: the max, median, and mean of these numbers are used as features (3 features). |
| (4) Length and timing-based Features: Features that combine query/response lengths and timings. | FS4-1 (both). The ratio of cumulative bytes sent over bytes received: the trace is divided into tenths, and the ratio of bytes transmitted to bytes received at the end of each segment is used as features (10 features). The study also calculated the ratio of total bytes sent over total received (1 feature). The study also calculated the mean of the ratios calculated at each point a packet is captured (1 feature).<br>FS4-2 (both). Time to first N bytes: the time taken to receive N = {3000, 4000, 5000, 6000, 7000} bytes of data are used as features (5 features). |
| (5) Timing and count-based Features. Features that combine query/response timings and counts. | FS5-1 (queries). The number of queries per second: the maximum, median, mean, minimum, and deciles of these values are used as features (14 features).<br>FS5-2 (responses). The number of responses per second: the maximum, median, mean, minimum, and deciles of these values are used as features (14 features). |

In total, the study developed 153 features in building traffic analysis classifiers to evaluate the effectiveness of the obfuscation approaches. This comprehensive set aims to capture all the potential information that could be extracted from DoH traffic to ensure the robustness and generalizability of the results in the evaluation of proposed obfuscation approaches. The study used a Random Forest classifier to build an adversarial traffic analysis system.

Results of (1) Baseline (only null-padding) study. At the first stage, the study evaluated the effectiveness of the standard null-byte padding for DoH traffic obfuscation. The current recommendation for DoH is for a client to pad to a block length of 128 and for a server to pad responses to a block length of 468 in accordance with RFC 8467 using null bytes.

Figure 6A:
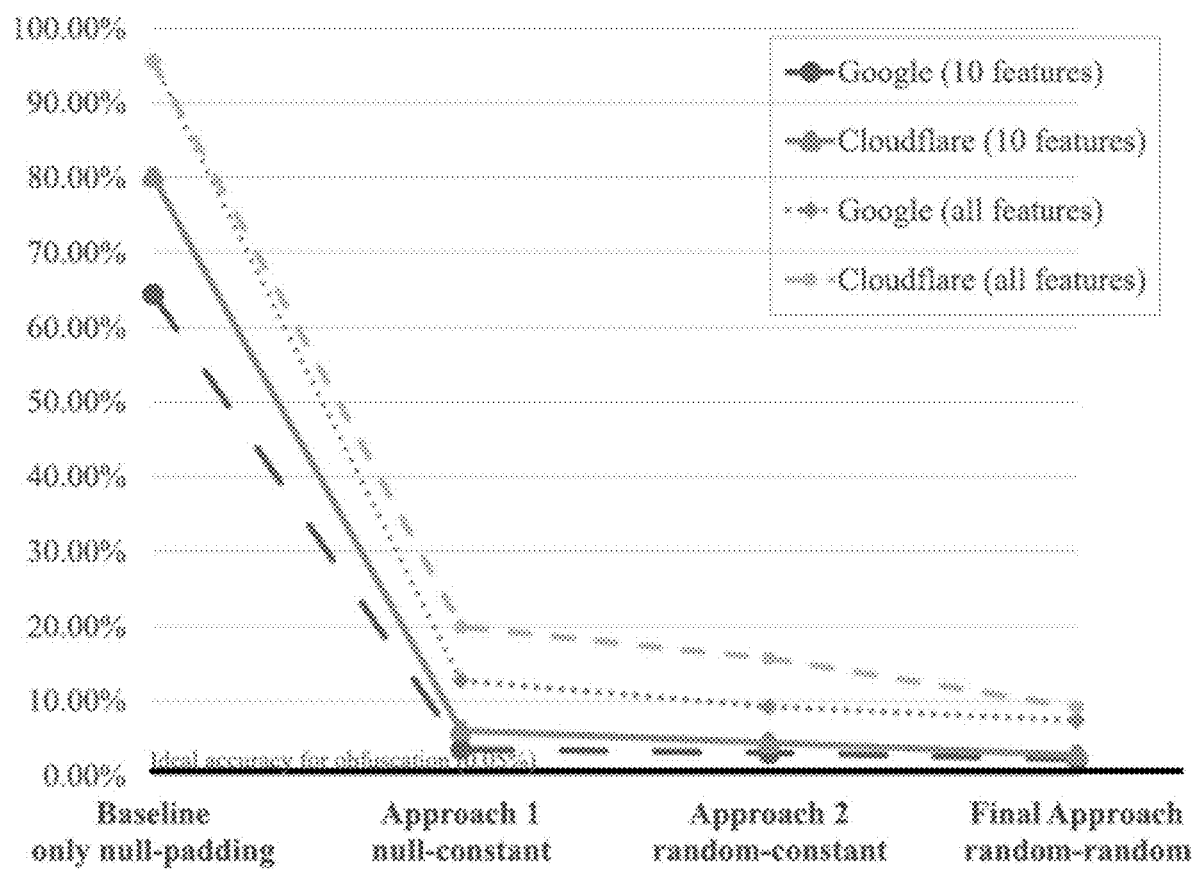
FIG. 6A is a graph that compares accuracy results of multi-class classification against different obfuscation strategies, according to some implementations.
Figure 6B:
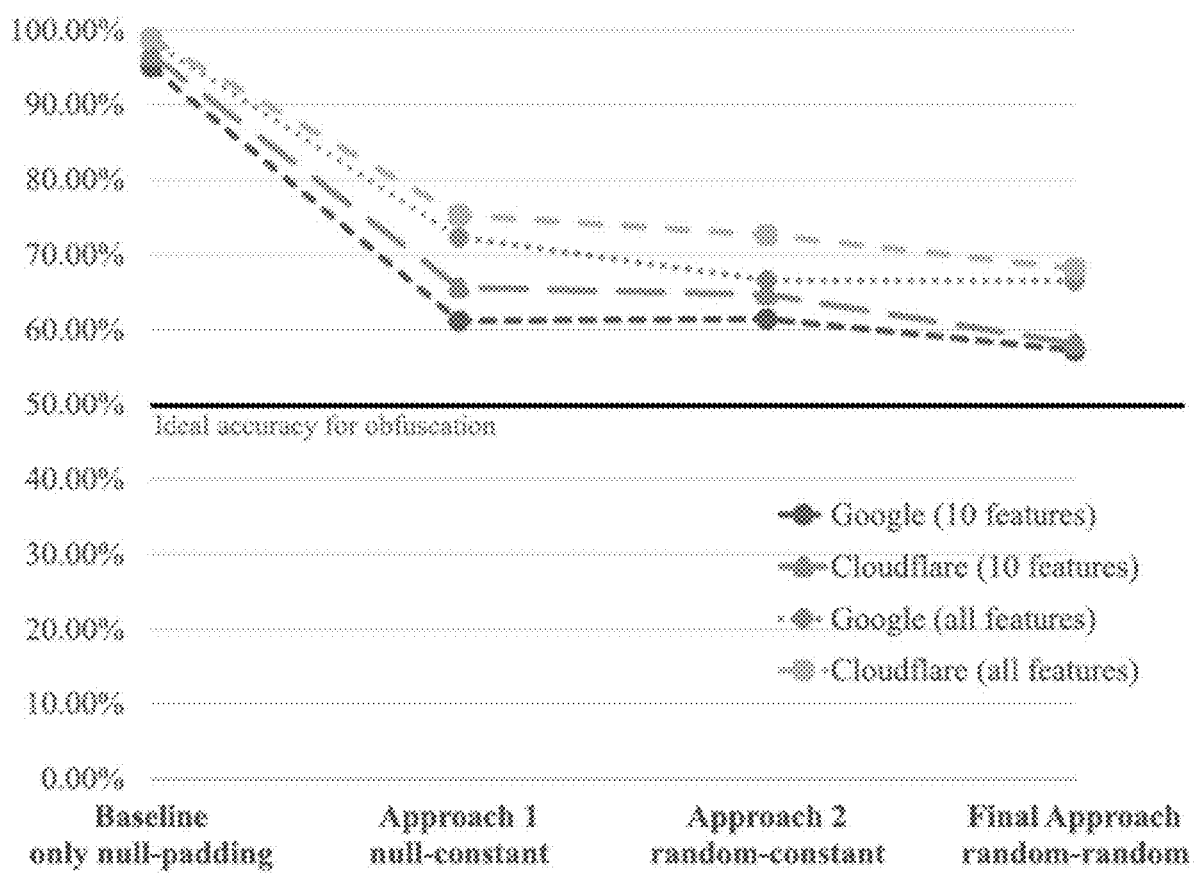
FIG. 6B is a graph that compares accuracy results of binary classification against different obfuscation strategies, according to some implementations.

Upon analyzing the results, the study found that (1) the multi-class classifier (using all features) achieves 95.58% and 95.59% accuracy against Google and Cloudflare resolvers, respectively (see FIG. 6A), and (2) the binary classifier (using all features) achieves 98.47% and 98.87% accuracy against Google and Cloudflare resolvers respectively (see FIG. 6B). This shows that null-byte padding is failing in obfuscating the DoH traffic against traffic analysis attacks.

Looking at the seven categories of features, the study observed that the null-byte padding-only approach is ineffective because the padding merely affects length-based features and fails to obfuscate other features that are either based on timings or counts.

Results of (2) Intermediary approach I (null-constant): adding fake queries to null-bye padding. Tables 3A and 3B provide a list of the top 10 most informative features for multi-class classification against the baseline approach on Google and Cloudflare resolvers, respectively. Note that seven out of ten features are common between the two lists, which is expected.

TABLE 3A

| Top 10 Features (Google) | Class | Q/R? |
|---|---|---|
| Time_to_first_4000_bytes (FS4-2) | length, timing | R |
| Length response mean (FS1-2) | length | R |
| Ratio of (query/resp) length seg1 (FS4-1) | length, timing | Both |
| Cumulative bytes decile9 (FS1-3) | timing | Both |
| Time from resp to adj query dec1 (FS2-4) | timing | Both |
| Ratio of (query/resp) length seg2 (FS4-1) | length, timing | Both |
| Time to first 5000 bytes (FS4-2) | length, timing | R |
| Time to first 6000 bytes (FS4-2) | length, timing | R |
| Time from query to adj resp dec9 (FS2-5) | timing | Both |
| Time to first 3000 bytes (FS4-2) | length, timing | R |

TABLE 3B

| Top 10 Features (Cloudflare) | Class | Q/R? |
|---|---|---|
| Time_to_first_4000_bytes (FS4-2) | length, timing | R |
| Time to first 5000 bytes (FS4-2) | length, timing | R |
| Ratio of (query/resp) length seg1 (FS4-1) | length, timing | Both |
| Time to first 6000 bytes (FS4-2) | length, timing | R |
| Ratio of (query/resp) length seg2 (FS4-1) | length, timing | Both |
| Time to first 3000 bytes (FS4-2) | length, timing | R |
| Time to first 7000 bytes (FS4-2) | length, timing | R |
| Cumulative bytes decile9 (FS1-3) | length | Both |
| Time between two adj resp mean (FS2-3) | timing | R |
| Cumulative bytes decile8 (FS1-3) | length | Both |

After inspecting the results, the study observed that 1) each website tends to have a different transmission time, i.e., the duration it takes to load (when all name resolutions are made). This difference makes padding ineffective, as transmission time does not depend on padding; 2) the aggregate query and response lengths (e.g., the sum of query or response lengths) are different for each website, even with the padding. This may be because every website requires a different number of queries and responses to load. The padding only relatively increases the aggregate query (response) lengths for each webpage, but the aggregate lengths are still associable with specific websites; and 3) the number of queries issued, and responses issued by each webpage is usually different, and padding has no obfuscation effect on this.

To this end, the study concludes that obfuscation of these features may be performed by injecting fake queries among the real queries required for loading the website, as explained next. To obfuscate transmission times, the stub may be configured to never stop sending queries. Specifically, after every 125 milliseconds (i.e., the average time between two consecutive DNS queries in the pure padding baseline results), the stub will check to see if it has a real query from any querying source to send; if so, it sends out this query; otherwise, it generates a fake query and sends out that one. The domain for the fake query is randomly chosen from a list of top Alexa websites and generated based on the RFC1035 standard. The stub continues this process for as long as it is running, so while resolving real queries could finish far before 30 seconds, the stub keeps issuing fake queries until the loading (transmission) time reaches 30 seconds.

This added obfuscation (1) can drop the accuracy of the multi-class classifier against Google from 95.58% to 12.68% and against Cloudflare from 95.59% to 19.98% (see FIG. 6A), and (2) the binary classifier against Google from 98.74% to 72.29%, and against Cloudflare from 98.87% to 75.24% (see FIG. 6B). This drastic change in accuracy illustrates the utility of injecting fake queries, as it can impact query/response counts, timings and total transmission time, and aggregate lengths (individual lengths obfuscation are handled via padding).

Tables 4A and 4B show the list of the top ten most informative features against this enhanced obfuscation.

TABLE 4A

| Top 10 Features (Google) | Class | Q/R? |
|---|---|---|
| Time_to_first_4000_bytes (FS4-2) | length, timing | R |
| Length response mean (FS1-2) | length | R |
| Ratio of (query/resp) length seg1 (FS4-1) | length, timing | Both |
| Cumulative bytes decile9 (FS1-3) | timing | Both |
| Time from resp to adj query dec1 (FS2-4) | timing | Both |
| Ratio of (query/resp) length seg2 (FS4-1) | length, timing | Both |
| Time to first 5000 bytes (FS4-2) | length, timing | R |
| Time to first 6000 bytes (FS4-2) | length, timing | R |
| Time from query to adj resp dec9 (FS2-5) | timing | Both |
| Time to first 3000 bytes (FS4-2) | length, timing | R |

TABLE 4B

| Top 10 Features (Cloudflare) | Class | Q/R? |
|---|---|---|
| Time_to_first_4000_bytes (FS4-2) | length, timing | R |
| Time to first 5000 bytes (FS4-2) | length, timing | R |
| Ratio of (query/resp) length seg1 (FS4-1) | length, timing | Both |
| Time to first 6000 bytes (FS4-2) | length, timing | R |
| Ratio of (query/resp) length seg2 (FS4-1) | length, timing | Both |
| Time to first 3000 bytes (FS4-2) | length, timing | R |
| Time to first 7000 bytes (FS4-2) | length, timing | R |
| Cumulative bytes decile9 (FS1-3) | length | Both |
| Time between two adj resp mean (FS2-3) | timing | R |
| Cumulative bytes decile8 (FS1-3) | length | Both |

Obfuscating transmission times and injection of fake queries successfully reduced the informativeness of all features (Tables 1A and 1B). Specifically, transmission time, the sum of query lengths, and the sum of response lengths moved out of the list of top 10 informative features. However, the study observed several length-based features are still among the topmost informative ones, which was counter-intuitive given that the queries and responses are padded. For example, the 9th decile of cumulative bytes is still a distinguishing feature against both Google and Cloudflare resolvers. The study observed that null-byte padding still reveals the original length of padded queries, meaning that the classifier could still rely on these length-based features for classification.

The study also observed that while TLS compression is disabled by default due to its vulnerability to severe cryptographic attacks such as CRIME, HTTP/2 header compression by default is enabled. HTTP/2 supports a new dedicated header compression algorithm, called HPACK, which was developed with attacks like CRIME in mind, and is therefore considered secure to use. With HTTP/2 compression (or alternatively any other compression including TLS compression or HTTP/1.1 compression) in place, since all queries are padded to multiples of 128 octets with null bytes, shorter queries will have a higher number of null bytes. This means that shorter queries (and responses) can be compressed more than the larger ones.

Results of (3) Intermediary Approach II (random-constant): Adding compression-aware padding. As discussed above, the study observed that HTTP/2 compression still leaks query and response lengths. In order to fix this issue, the study changed from null-byte padding to padding with random strings. This ensures that the padding would obfuscate query/response lengths, independent of the configuration of the client machine and the resolver. To ensure that all queries have a similar distribution of characters, the study generated padding strings by randomly choosing, encoding, and concatenating domain names from a list of websites until the desired padding length was hit. The study employed these domain names from the set of target websites to ensure similar character distribution (similar character entropy) among different pads, but any list of domain names should satisfy this requirement.

From the study, it was observed that adding this obfuscation (1) reduced the accuracy of a multi-class classifier against Google resolver from 12.68% to 9.21% and against Cloudflare from 19.97% to 15.71% (see FIG. 6A), and (2) reduced accuracy of a binary classifier against Google resolver from 72.29% to 66.58% and against Cloudflare from 75.24% to 72.61% (see FIG. 6B).

Tables 5A and 5B show the list of the top 10 most informative features after replacing the null-byte padding of the previous approach with this random-byte padding. Note that after adding random-byte padding, all top ten informative features are partially or fully dependent on query and response timings and not lengths. The only exception is the mean of response lengths that is the second most informative feature against Google resolver. However, this feature only depends on response lengths, which are padded by the resolver and cannot be controlled by the client.

TABLE 5A

| Top 10 Features (Google) | Class | Q/R? |
|---|---|---|
| Time_to_first_4000_bytes (FS4-2) | length, timing | R |
| Length response mean (FS1-2) | length | R |
| Time from query to adj resp dec9 (FS2-5) | timing | Both |
| Time to first 5000 bytes (FS4-2) | length, timing | R |
| Time to first 3000 bytes (FS4-2) | length, timing | R |
| Ratio of (query/resp) length seg1 (FS4-1) | length, timing | Both |
| Time to first 6000 bytes (FS4-2) | length, timing | R |
| Cumulative bytes decile9 (FS1-3) | length | Both |
| Time from query to adj resp dec1 (FS2-4) | timing | Both |
| Time to first 7000 bytes (FS4-2) | length, timing | R |

TABLE 5B

| Top 10 Features (Cloudflare) | Class | Q/R? |
|---|---|---|
| Time to first 5000 bytes (FS4-2) | length, timing | R |
| Time to first 4000 bytes (FS4-2) | length, timing | R |
| Time to first 3000 bytes (FS4-2) | length, timing | R |
| Time to first 6000 bytes (FS4-2) | length, timing | R |
| Time to first 7000 bytes (FS4-2) | length, timing | R |
| Running ratio mean (FS4-1) | length, timing | Both |
| Time between two adj resp mean (FS2-3) | timing | R |
| Time from query to adj resp mean (FS2-5) | timing | Both |
| Ratio of (query/resp) length seg1 (FS4-1) | length, timing | Both |
| Time from query to adj resp dec10 (FS2-5) | timing | Both |

Specifically, four features out of ten in both lists are statistics on the duration of the interval between consecutive queries and responses. Also, all other features are partially or fully dependent on packet timings. This shows that timing-based features have become more informative than features that only rely on lengths, especially query lengths.

Results of (4) Final Approach (random-random): Randomizing query Forwarding times. Analysis of results from previous steps shows that after obfuscating length-based and count-based features, the most informative ones are those that partially or fully rely on timings. This is because, in the previous step, the queries (fake or real) are being sent out at fixed intervals. The main problem of sending queries after every 125 millisecond is that as long as the time between real queries remains approximately the same, they will be sent out by the stub at specific times, which will be consistent across multiple runs. Suppose to load a webpage, the browser sends three queries at times 50, 330, and 310 milliseconds; these queries will always be sent out at times 125, 350, 375 in all runs. Note that the round-trip time of a query/response (duration between when a query to a specific domain is sent out and when the response for that query is sent back) is not within the control of the client stub. For a specific domain and resolver, this time is expectedly consistent across most of the runs. While fake queries change from one run to another, real queries and their sequence for a certain webpage remain the same.

Therefore, since the real queries are sent out at the same times and their round-trip times are consistent across multiple runs, some of the timings-based features are preserved across different runs, including: FS2-5—the durations between a query and their next adjacent response (only when both are real); FS2-4—durations between a response and its next adjacent query (only when both are real); and FS2-3—durations between consecutive responses (only when both are real). This information leakage makes at least part of these timings-based features useful for traffic analysis.

To obfuscate these distinguishing features, rather than sending out one query every 125 milliseconds, the study randomized the times at which the stub sends out queries to a duration between 62 and 188 ms, but the average query sending time is still kept at 125 ms. Adding this last obfuscation was observed to (1) reduce the accuracy of a multiclass classifier against Google resolver from 9.21% to 7.36% and against Cloudflare resolver from 15.71% to 9.14% (see FIG. 6A), and (2) reduces the accuracy of a binary classifier against Google from 66.58% to 66.49% and against Cloudflare from 72.61% to 68% (see FIG. 6B). For the multi-class classification, while 7.36% and 9.14% are still more accurate than a random guess probability (for 300 target websites $1/300=0.5\%$), it is achieved by only modifying the client-side aspects of the DoH protocol, without relying on any participation or collaboration from the resolver. With the resolver not being involved in obfuscation, some of the response-based features are not fully obfuscated.

Figure 6C:
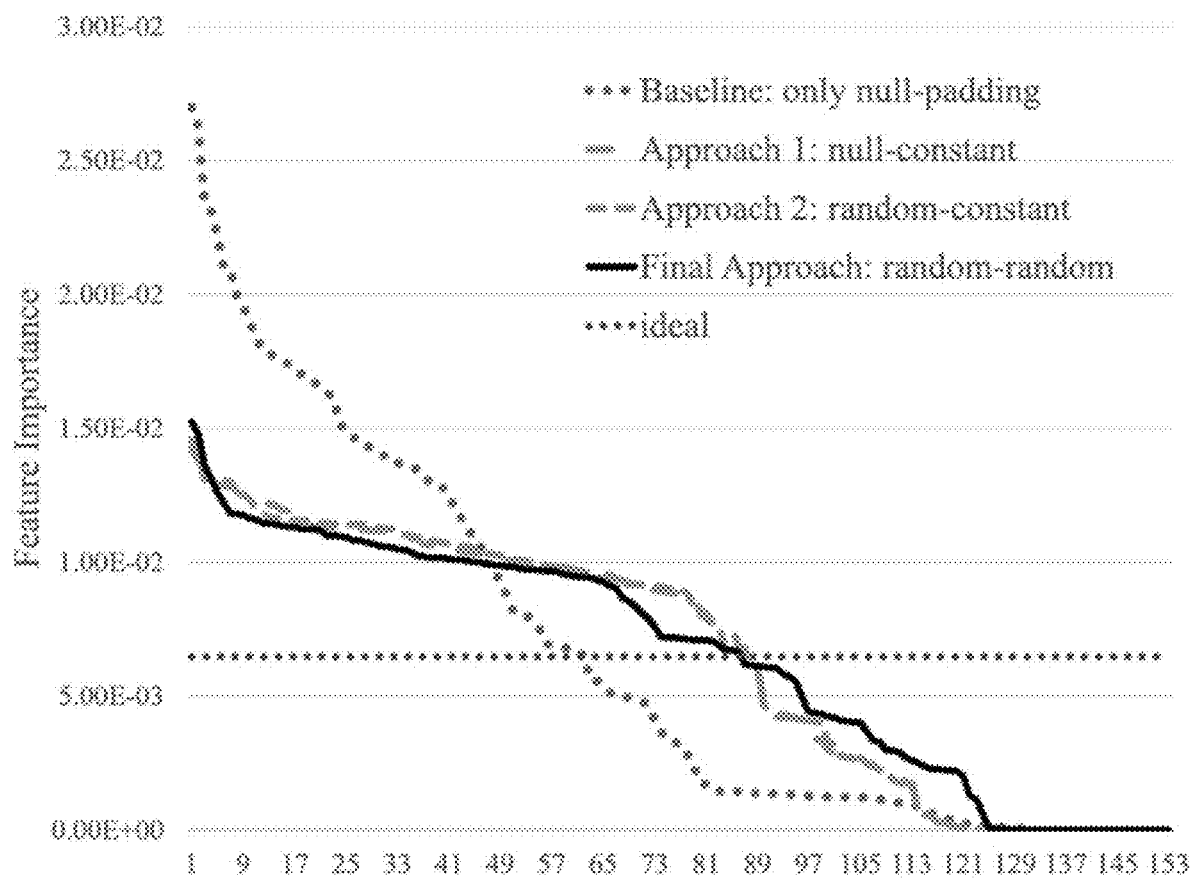
FIG. 6C is a graph of feature importance values for different obfuscation strategies, according to some implementations.

For the binary classifier, the final obfuscation approach reduces the accuracy of this classifier to 66% and 68%, respectively. While this is still more accurate than a random guess probability ($1/2=50\%$), it is again achieved by only modifying the client-side behavior. FIG. 6C shows the achieved feature importance (in descending order) for all 153 features against all four different strategies (baseline, null-constant, random-constant, and random-random (final approach)). Note that the feature weights against the final approach are closer as compared to the baseline and also intermediary approaches.

To verify this, the study calculated the KL-divergence of the feature importance weights for different approaches from a uniform distribution where every feature has the same weight (for 153 features, each feature has 1/153 probability/weight). KL-divergence, also called relative entropy, is a measure of how one probability distribution is different from a second reference probability distribution (in this case, the uniform distribution).

Figure 7A:
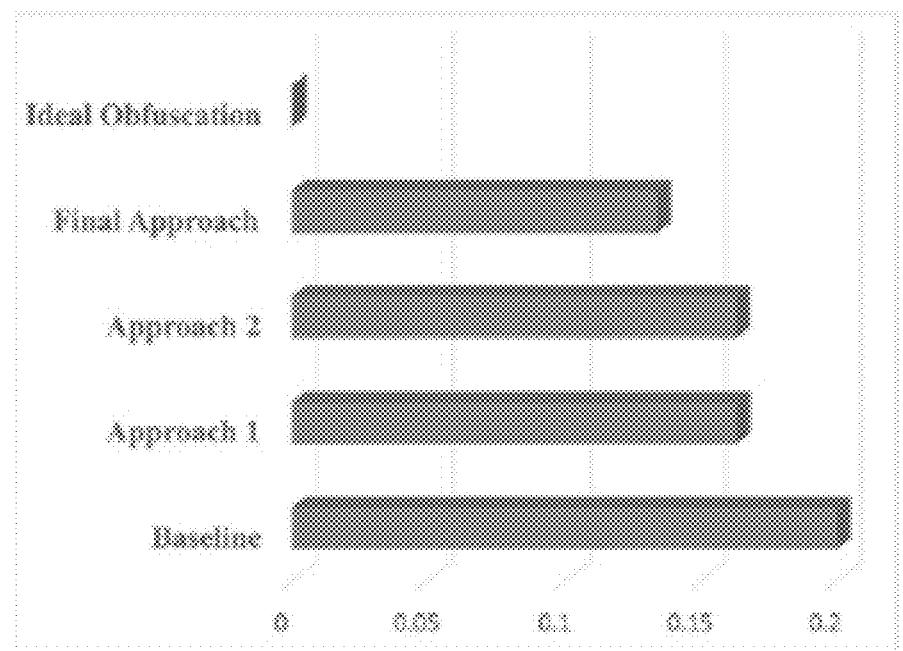
FIGS. 7A and 7B are graphs that compare K-L divergence and entropy, respectively, for different obfuscation strategies, according to some implementations.
Figure 7B:
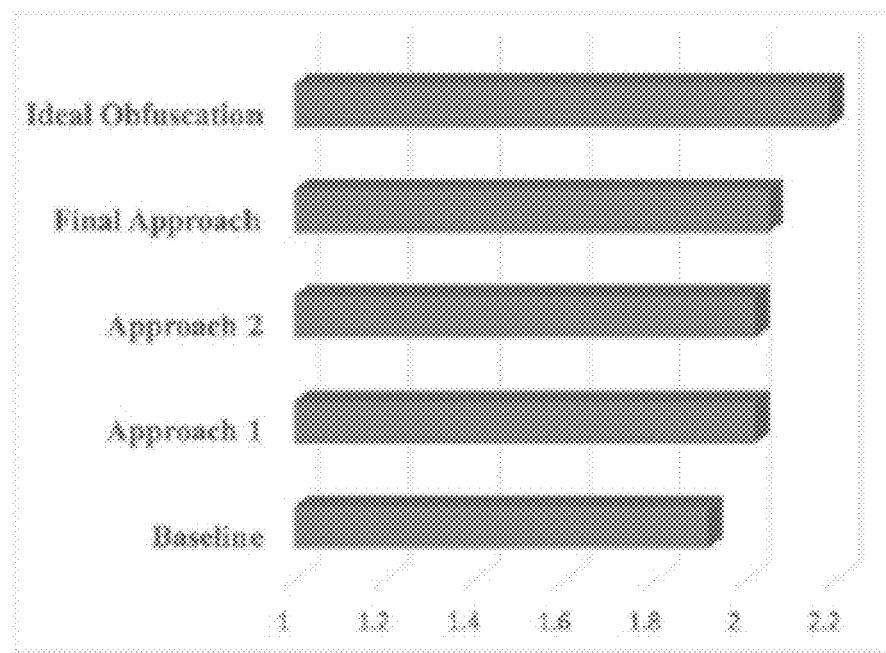

FIG. 7A shows the measured KL-divergence for all four approaches. FIG. 7B shows entropy for all four approaches. Note that as the baseline is moved to the final proposed solution, the divergence decreases, with the final approach having the lowest divergence from the uniform distribution. However, note that the relative entropy is still not 0 or close to 0, which shows that the obfuscation is not ideal.

Tables 6A and 6B show the list of the top ten most informative features against the final client-side obfuscation approach. Note that all features on both lists are fully or partially response based. Since the resolver is still using null-byte padding, the individual and aggregate response lengths are still not fully obfuscated. This is also verified by the fact that the mean of response lengths (Length_response_mean) is among the topmost informative features on both lists. Also, the timing-based features are still not fully obfuscated since the DNS resolver incurs no delays on DNS responses, and the duration of intervals between a query and its corresponding response is not affected as a result.

TABLE 6A

| Top 10 Features (Google) | Class | Q/R? |
| --- | --- | --- |
| Length response mean (FS1-4) | length, timing | R |
| Time from resp to adj query dec9 (FS2-5) | timing | Both |
| Ratio of (query/resp) length seg1 (FS4-1) | length, timing | Both |
| Time from resp to adj query mean (FS2-5) | timing | Both |
| Running ratio mean (FS4-1) | length, timing | Both |
| Time from resp to adj query dec1 (FS2-4) | timing | Both |
| Time from resp to adj query max (FS2-5) | timing | Both |
| Ratio of (query/resp) length seg3 (FS4-1) | length, timing | Both |
| Ratio of (query/resp) length seg2 (FS4-1) | length, timing | Both |
| Time from query to adj resp dec10 (FS2-5) | timing | Both |

TABLE 6B

| Top 10 Features (Cloudflare) | Class | Q/R? |
| --- | --- | --- |
| Running ratio mean (FS4-1) | length, timing | Both |
| Num of consecutive responses mean (FS3-4) | count | R |
| Time between two adj responses mean (FS2-3) | timing | R |
| Ratio of (query/resp) length seg1 (FS4-1) | length, timing | Both |
| Time from query to adj resp mean (FS2-5) | timing | Both |
| Length response mean (FS1-2) | length, timing | R |
| Ratio of (query/resp) length seg2 (FS4-1) | length, timing | Both |
| Time to first 4000 bytes (FS4-2) | length, timing | R |
| Ratio of (query/resp) length seg6 (FS4-1) | length, timing | Both |
| Time from query to adj resp max (FS2-5) | timing | Both |

Note that this obfuscation is only conducted on the client-side stub. This means that the remaining leakage potentially emanates from the lack of obfuscation from the resolver side.

To evaluate the overhead of the obfuscation techniques described herein, a scenario was considered where the stub is only serving the DNS requests from a single webpage. As justified above, it was assumed that a new webpage is visited every 30 seconds, and therefore the size of DNS data (queries and responses) exchanged over the first 30 seconds after the page is requested denotes the DNS bandwidth overhead for loading that webpage.

Figure 8A:
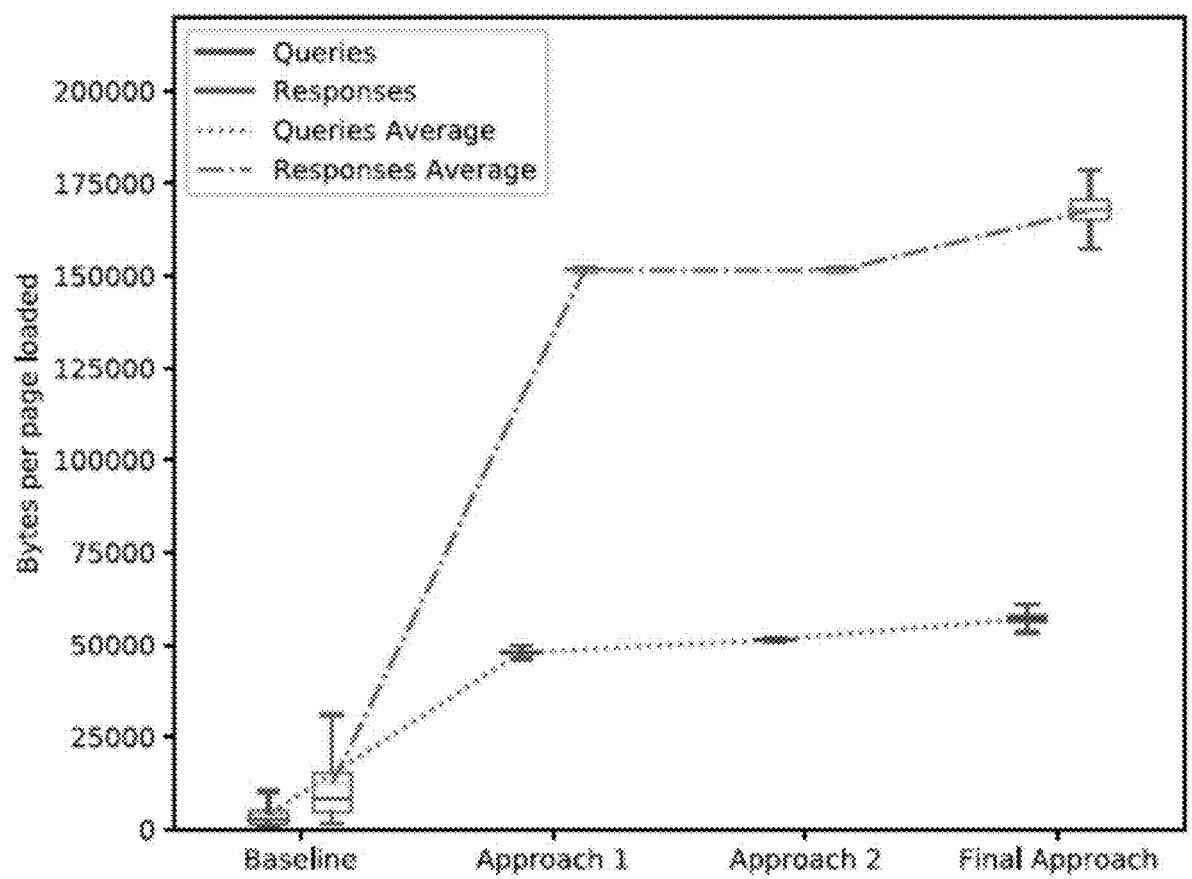
FIGS. 8A and 8B are graphs that compare DNS bandwidth requirements for loading websites using different obfuscation strategies, according to some implementations.
Figure 8B:
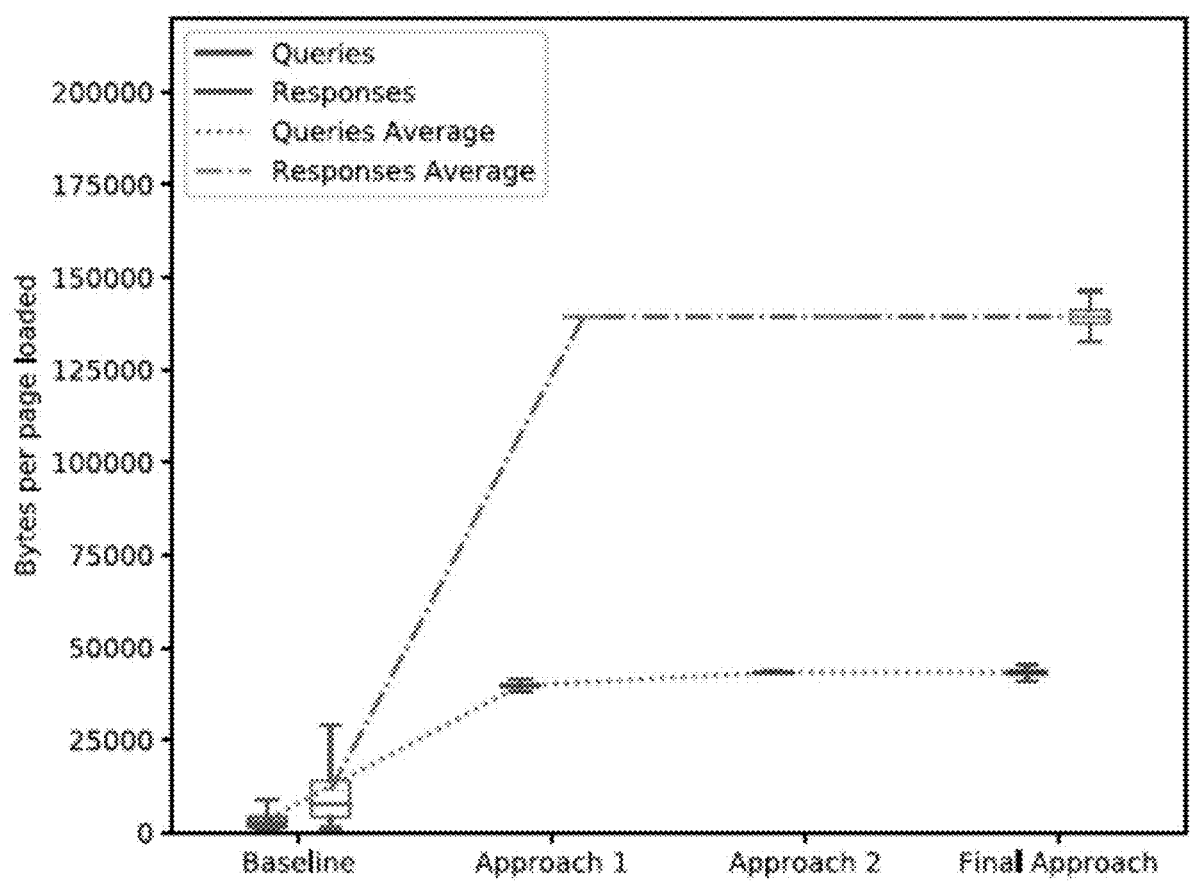

FIGS. 8A and 8B show the min, quantiles, max, and average DNS bandwidth (total size of queries, and total size of responses) required for loading websites for each of the four different approaches using Google and Cloudflare resolvers, respectively. Firstly, note that for Google case, the final approach requires 14.07 times more bytes for DNS queries and 13.54 times more bytes for DNS responses on average. This corresponds to 52.99 KB extra for DNS queries and 155.40 KB extra for DNS responses on average. For the Cloudflare case, the final approach requires 12.19 times more bytes for DNS queries and times more bytes for DNS responses on average. This corresponds to 39.71 KB extra for DNS queries and 128.02 KB extra for DNS responses on average.

Secondly, note that for the intermediary approaches (e.g., approaches 1 and 2) that use fixed intervals for sending out fake queries, min, max, quantiles, and average are all the same value for both DNS queries and responses in both Google and Cloudflare cases. This is because the timings between queries is fixed for these approaches and also query sizes and response sizes are all padded to the same size, and thus in any time interval (30 seconds here), any webpage would generate the same number of queries all with same sizes and would receive the same number of responses all with same sizes. Thus, all webpages require the same bandwidth for DNS queries and responses for approach 1 and 2. For the baseline and final obfuscation approaches, however, the min, max, average and quantiles do not coincide. For the baseline, this is expected because the number of queries (and thus responses) are different, but fixed, for each page. For the final obfuscation, this is also expected, because the timings between sending out queries are randomized in this approach, and thus a webpage visit results in a slightly different number of issued DNS queries (and thus responses) from one run to another. However, it is very important to note these changes in the DNS bandwidth are random, and the same page could require different DNS bandwidths in different visits, since inter-query timings are random. In other words, this does not enhance the distinguishability of total DNS/response sizes for traffic analysis, and potentially even reduces it due to this randomized behavior.

The imposed overhead is reasonable for several reasons. First, the total extra overhead for DNS bandwidth (sum of all query and response sizes) for a webpage on average is 191.95 KB for Google and 152.81 KB for Cloudflare. This is still a negligible portion of available bandwidths to clients in today's networks, especially compared to the size of the rest of the contents (HTML pages, images, third-party CSS and Javascript files) that need to be downloaded for loading a webpage. As of June 2021, the median webpage sizes for desktop and mobile devices were 2.12 and 1.91 MB, respectively. Secondly, the experimentation discussed herein focuses on a scenario where only a single source is issuing queries, and thus these results represent the worst-case scenario. When multiple sources are querying, the stub has more real queries to forward and less need to generate fake queries. Thirdly, the bandwidth overhead is dependent on the average duration of the interval between every two queries ($\delta$ in Algorithm 1). Increasing the interval duration means that fewer fake queries need to be generated in a fixed amount of time, thus reducing the overhead.

Discussion

As mentioned above, several standards such as DoH, DoT, and DoC have been proposed to encrypt DNS traffic on the Internet. In DoH, the DNS traffic is wrapped in HTTP requests/responses and then tunneled through a TLS channel, while in DoT, the raw DNS traffic is transferred over a TLS channel. In DoC, DNS traffic is transferred via QUIC, which is a new transport layer protocol. While encryption prohibits attackers from accessing the plain data in communications, it does not protect them from traffic analysis attacks which rely on the information leaked from the traffic pattern, including packet lengths, counts, and timings, to infer sensitive information about the communication.

For example, researchers have shown that the traffic pattern of encrypted web traffic (HTTPS) is sufficient to reveal the webpage being browsed with a high level of accuracy. This is accomplished by building classifiers that use features based on lengths, counts, and timings of intercepted HTTPS packets to identify the visited website. The underlying reason for why traffic analysis works is that packet counts, timings, and lengths are not affected in the encryption process, and meanwhile, the traffic footprint of an encrypted webpage is sufficiently unique (e.g., as every webpage has a different base document and a different set of external objects like CSS and JS files) to classify it with high accuracy.

The same also applies to encrypted DNS traffic, in the sense that enough information is leaked from encrypted DNS traffic to reveal the visited webpages based on the trace of DNS queries and responses observed during the browsing of this webpage. This is possible because every webpage requires a different set and number of cross-origin DNS queries for loading, which results in a sufficiently unique traffic footprint (e.g., unique packet counts, lengths, or timings) for classifiers to identify the visited website.

To address this issue, padding extension for DNS was introduced in RFC 7830, enabling the addition of arbitrary length padding to DNS queries and responses before encrypting them, in order to obfuscate the lengths of DNS queries and responses. The underlying assumption is that by effectively obfuscating packet lengths, we can prevent traffic analysis attacks. RFC 8467 explores several possible padding strategies and recommends using one of them, called the Block-Length Padding strategy, as a standard padding approach. However, recent studies have shown that DNS padding is inadequate as machine learning algorithms can still achieve a high level of accuracy in determining the visited webpage even with all queries and responses padded.

In DoH, DNS traffic between a DNS client and its local DNS resolver is channeled through an encrypted HTTPS tunnel. However, adversaries can still infer users' web browsing activities from encrypted DoH traffic (as well as other encrypted traffic) through machine-learning-based TA attacks that rely on unencryptable features in the DNS footprint of a website, including query/response lengths and counts, and delays between subsequent queries (timing), to identify which website is being visited, as mentioned above. To defend against such TA attacks, existing DoH clients and resolvers can pad DNS queries and responses with null bytes to certain block sizes before encrypting them, e.g., as recommended in RFC 8467. However, as shown by prior research and discussed herein, this padding alone is not effective in defeating TA attacks, and even with this padding, attackers can still achieve over 95% accuracy. As discussed herein, this standard null-byte padding strategy is fundamentally flawed, especially with HTTPS (or TLS) compression enabled.

Many research works have shown that while encrypting data traffic prohibits attackers from directly accessing them, it does not protect the data against passive traffic analysis attacks in which attackers use statistical or machine-learning-based techniques that rely on traffic metadata such as (a) packet lengths, (b) packet counts, or (c) packet timings to infer sensitive information about the data from eavesdropped encrypted communications. Examples include traffic analysis attacks that succeed to identify the language spoken or even the speaker in a conversation over an encrypted VoIP traffic, identify web pages or other user activities from encrypted HTTP packets, identify the application type from encrypted SSH traffic, identity the application from encrypted P2P traffic, detect drones through Wi-Fi statistical fingerprint analysis of their traffic, or learn about the underlying characteristics of users and spoken languages from encrypted traffic of messaging applications. Specific to DNS traffic, recent works show viability and effectiveness of traffic analysis attacks on encrypted DNS traffic (DoH and DoT) to identify which website is being visited by a user.

With regard to defense against TA attacks on encrypted traffic, several classes of approaches have been proposed, which are categorized herein based on the adopted manipulation strategy:

Padding: The standard approach for traffic obfuscation is to obfuscate plaintext lengths by extending the plaintexts with padding before encryption. Different padding techniques for DNS packets have been proposed and standardized over the years, including random padding, linear padding, exponential padding, mice-elephants padding, and maximum padding (also called quantization or Pad-to-MTU). For DNS traffic obfuscation, the EDNS(0) padding option standard introduced in RFC 7830 and refined in RFC 8467 allows DNS clients and servers to pad request and response messages with a variable number of octets. Only using padding for traffic obfuscation is insufficient, because it cannot obfuscate count-based and timing-based features. Therefore, even when such padding obfuscates all query/response lengths ideally, TA techniques can still use count-based and timing-based features to conduct a highly accurate classification.

Distribution morphing (through padding and splitting): These approaches, which have been proposed for a different but related threat model of classifying Web traffic, morph the distribution of packet lengths into a pre-defined target distribution by chopping and padding them. These approaches, while being more effective than pure padding for obfuscation of packet lengths and counts, fail to effectively obfuscate many features of the traffic, including total transmission time (FS2-1), as well as the bursts in the data (FS1-3).

Injection of dummy packets: The third possible approach is to obfuscate the features of the traffic by injecting dummy packets (fake data) in addition to padding packets; however, such obfuscation in practice is challenging because, without a careful configuration, it could even benefit the adversary. For example, when all flows are prolonged to have a minimum transmission time if this minimum is not sufficiently large to accommodate all flows, then flows with durations longer than the minimum threshold would become very distinguishable. Game-theoretically optimal dummy packet injection methods along with multi-path randomization to defeat TA attacks on Web traffic have been proposed as well. While insightful, these works merely provide a theoretical framework primarily focused on the obfuscation of Web traffic, and thus results are neither applicable nor generalizable to encrypted DNS traffic.

In general, existing countermeasures against TA attacks only obfuscate some features of the traffic while leaking others. If a solution fails to obfuscate some features of the encrypted traffic, TA attacks can always rely on these features to classify flows with sufficient accuracy.

As in TA attacks, attackers are also assumed to be able to sniff the DNS traffic originating from the target system and destined to its DNS resolver. In other words, attackers have access to a network link between the target system and the DNS server that allows them to eavesdrop on the entire DNS traffic between these systems, but the attacker does not have access to the target system nor the DNS resolver. With this access, the attackers perform traffic analysis on the encrypted DNS traffic to detect the websites being browsed by the users. For the purposes of this disclose, it was assumed that, for each targeted website, the attacker only visits and analyzes the homepage (e.g., index.html) of the targeted websites. A webpage visit results in a time-sequence of DNS query and response packets. Since the whole DNS traffic is encrypted with the DoH protocol, the plaintext DNS queries and responses are not accessible by attackers. However, the metadata, such as length, timestamp, and traffic direction, is still exposed, giving enough information to attackers to potentially conclude the destination webpage and, thus, the website being visited.

Example Implementations

It should be appreciated that the logical operations described above can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Figure 9:
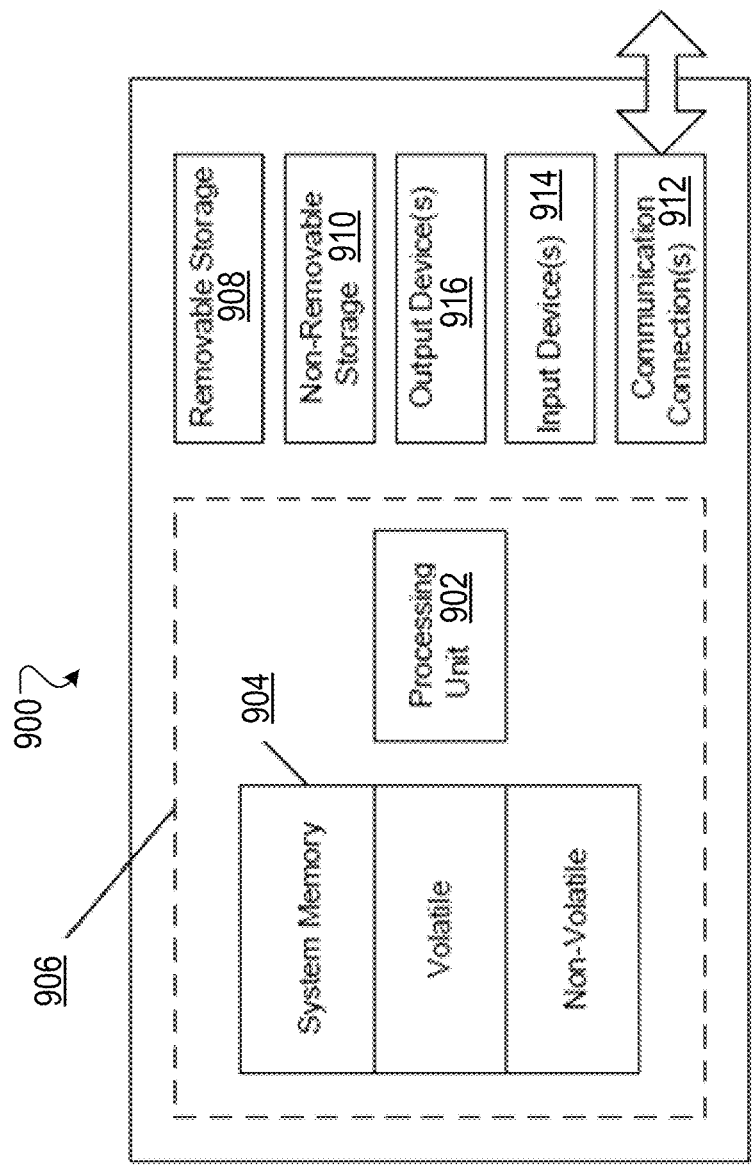
FIG. 9 is a block diagram of a computing system for implementing the methods described herein, according to some implementations.

Referring now to FIG. 9, an illustrative computer architecture for a computer system 900 capable of executing the software components that can use the output of the exemplary method described herein is shown, according to some implementations. The computer architecture shown in FIG. 9 illustrates an example computer system configuration, and the computer 900 can be utilized to execute any aspects of the components and/or modules presented herein described as executing on the analysis system or any components in communication therewith.

In an implementation, the computing device 900 may include two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an implementation, virtualization software may be employed by the computing device 900 to provide the functionality of a number of servers that is not directly bound to the number of computers in the computing device 900. For example, virtualization software may provide twenty virtual servers on four physical computers. In an implementation, the functionality disclosed above may be provided by executing the application and/or applications in a cloud computing environment. Cloud computing may include providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may include cloud computing resources owned and operated by the enterprise as well as cloud computing resources hired and/or leased from a third-party provider.

In its most basic configuration, computing device 900 typically includes at least one processing unit 920 and system memory 930. Depending on the exact configuration and type of computing device, system memory 930 may be volatile (such as random-access memory (RAM)), non-volatile (such as read-only memory (ROM), flash memory, etc.), or some combination of the two.

This most basic configuration is illustrated in FIG. 9 by dashed line 910. The processing unit 920 may be a standard programmable processor that performs arithmetic and logic operations necessary for the operation of the computing device 900. While only one processing unit 920 is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/functionality. For example, computing device 900 may include additional storage such as removable storage 940 and non-removable storage 950, including, but not limited to, magnetic or optical disks or tapes. Computing device 900 may also contain network connection(s) 980 that allow the device to communicate with other devices such as over the communication pathways described herein. The network connection(s) 980 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 970 such as keyboards, keypads, switches, dials, mice, track balls, touch screens, voice recognizers, card readers, paper tape readers, or other well-known input devices. Output device(s) 960 such as printers, video monitors, liquid crystal displays (LCDs), touch screen displays, displays, speakers, etc., may also be included. The additional devices may be connected to the bus in order to facilitate the communication of data among the components of the computing device 900. All these devices are well known in the art and need not be discussed at length here.

The processing unit 920 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 920 for execution. Example tangible, computer-readable media may include but is not limited to volatile media, non-volatile media, removable media, and non-removable media implemented in any method or technology for storage of information such as computer-readable instructions, data structures, program modules, or other data. System memory 930, removable storage 940, and non-removable storage 950 are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture different than that shown in FIG. 9.

In an example implementation, the processing unit 920 may execute program code stored in the system memory 930. For example, the bus may carry data to the system memory 930, from which the processing unit 920 receives and executes instructions. The data received by the system memory 930 may optionally be stored on the removable storage 940 or the non-removable storage 950 before or after execution by the processing unit 920.

Configuration of Certain Implementations

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the P t reference in the list. All references cited and discussed in this specification are incorporated herein by reference in their entireties and to the same extent as if each reference was individually incorporated by reference.

Moreover, the various components may be in communication via wireless and/or hardwire or other desirable and available communication means, systems, and hardware. Moreover, various components and modules may be substituted with other modules or components that provide similar functions.

Although example implementations of the present disclosure are explained in some instances in detail herein, it is to be understood that other implementations are contemplated. Accordingly, it is not intended that the present disclosure be limited in its scope to the details of construction and arrangement of components set forth in the following description or illustrated in the drawings. The present disclosure is capable of other implementations and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary implementations include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example implementations, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

REFERENCES

The following patents, applications, and publications as listed below and throughout this document are hereby incorporated by reference in their entirety herein:

[1] 2016. The EDNS(0) Padding Option. https://tools.ietf.org/html/rfc7830. (May 2016).
[2] 2021. DNS Prefetching. https://www.chromium.org/developers/design-documents/dns-prefetching. (2021).
[3] 2021. Facebook Experimental DoH Proxy. https://github.com/facebookexperimental/doh-proxy. (2021).
[4] 2021. The top 500 sites on the web. https://www.alexa.com/topsites. (2021).
[5] Riyad Alshammari, Peter I Lichodzijewski, Malcolm Heywood, and A Nur Zincir-Heywood. 2009. Classifying ssh encrypted traffic with minimum packet header features using genetic programming. In Proceedings of the 11th Annual Conference Companion on Genetic and Evolutionary Computation Conference: Late Breaking Papers. 2539-2546.
[6] Riyad Alshammari and A Nur Zincir-Heywood. 2007. A flow-based approach for ssh traffic detection. In 2007 IEEE international conference on systems, man and cybernetics. IEEE, 396-301.
[7] Riyad Alshammari and A Nur Zincir-Heywood. 2010. An investigation on the identification of VoIP traffic: Case study on Gtalk and Skype. In 2010 International Conference on Network and Service Management. IEEE, 310-313.
[8] Daniel J Arndt and A Nur Zincir-Heywood. 2011. A comparison of three machine learning techniques for encrypted network traffic analysis. In 2011 IEEE Symposium on Computational Intelligence for Security and Defense Applications (CISDA). IEEE, 107-114.
[9] John S Atkinson, O Adetoye, Miguel Rio, John E Mitchell, and George Matich. 2013. Your WiFi is leaking: Inferring user behaviour, encryption irrelevant. In 2013 IEEE Wireless Communications and Networking Conference (WCNC). IEEE, 1097-1102.
[10] Alireza Bahramali, Ramin Soltani, Amir Houmansadr, Dennis Goeckel, and Don Towsley. 2020. Practical Traffic Analysis Attacks on Secure Messaging Applications. arXiv preprint arXiv:2005.00508 (2020).
[11] Igor Bisio, Chiara Garibotto, Fabio Lavagetto, Andrea Sciarrone, and Sandro Zappatore. 2018. Unauthorized amateur UAV detection based on WiFi statistical fingerprint analysis. IEEE Communications Magazine 56, 4 (2018), 106-111.
[12] George Dean Bissias, Marc Liberatore, David Jensen, and Brian Neil Levine. 2005. Privacy vulnerabilities in encrypted HTTP streams. In International Workshop on Privacy Enhancing Technologies. Springer, 1-11.
[13] Xiang Cai, Xin Cheng Zhang, Brijesh Joshi, and Rob Johnson. 2012. Touching from a distance: Website fingerprinting attacks and defenses. In Proceedings of the 2012 ACM conference on Computer and communications security. ACM, 605-616.
[14] Arthur Callado, Carlos Kamienski, Geza Szabo, Balazs Peter Gero, Judith Kelner, Stenio Fernandes, and Djamel Sadok. 2009. A survey on internet traffic identification. IEEE communications surveys & tutorials 11, 3 (2009), 37-52.
[15] Zigang Cao, Gang Xiong, Yong Zhao, Zhenzhen Li, and Li Guo. 2014. A survey on encrypted traffic classification. In International Conference on Applications and Techniques in Information Security. Springer, 73-81.
[16] Rui Castro, Mark Coates, Gang Liang, Robert Nowak, and Bin Yu. 2004. Network tomography: Recent developments. Statistical Science (2004), 499-517.
[17] AHeroIII Coates, Alfred O Hero III, Robert Nowak, and Bin Yu. 2002. Internet tomography. IEEE Signal processing magazine 19, 3 (2002), 47-65.
[18] Mark Coates, Rui Castro, Robert Nowak, Manik Gadhiok, Ryan King, and Yolanda Tsang. 2002. Maximum likelihood network topology identification from edge-based unicast measurements. In ACM SIGMETRICS Performance Evaluation Review, Vol. 30. ACM, 11-20.
[19] Scott E Coull and Kevin P Dyer. 2014. Traffic analysis of encrypted messaging services: Apple imessage and beyond. ACM SIGCOMM Computer Communication Review 44, 5 (2014), 5-11.
[20] Qi Duan, Ehab Al-Shaer, and Haadi Jafarian. 2013. Efficient random route mutation considering flow and network constraints. In 2013 IEEE Conference on Communications and Network Security (CNS). IEEE, 360-368.
[21] Nick Duffield. 2006. Network tomography of binary network performance characteristics. IEEE Transactions on Information Theory 52, 12 (2006), 5373-5388.
[22] Nick G Duffield, Joseph Horowitz, F Lo Presti, and Don Towsley. 2002. Multicast topology inference from measured end-to-end loss. IEEE Transactions on Information Theory 48, 1 (2002), 26-45.
[23] Kevin P Dyer, Scott E Coull, Thomas Ristenpart, and Thomas Shrimpton. 2012. Peek-a-boo, i still see you: Why efficient traffic analysis countermeasures fail. In 2012 IEEE symposium on security and privacy. IEEE, 332-346.
[24] Saman Feghhi and Douglas J Leith. 2016. A web traffic analysis attack using only timing information. IEEE Transactions on Information Forensics and Security 11, 8 (2016), 1747-1759.
[25] Xinwen Fu, Yong Guan, Bryan Graham, Riccardo Bettati, and Wei Zhao. 2002. Using parasite flows to camouflage flow traffic. In Proceedings of 3rd Annual IEEE Information Assurance Workshop 2002. Citeseer.
[26] Paul Hoffman and Patrick McManus. 2018. Dns queries over https (doh). Internet Requests for Comments, RFC Editor, RFC 8484 (2018).
[27] Sara Hooker, Dumitru Erhan, Pieter-Jan Kindermans, and Been Kim. 2018. Evaluating feature importance estimates. (2018).
[28] Rebekah Houser, Zhou Li, Chase Cotton, and Haining Wang. 2019. An investigation on information leakage of DNS over TLS. In Proceedings of the 15th International Conference on Emerging Networking Experiments And Technologies. 123-137.
[29] Zi Hu, Liang Zhu, John Heidemann, Allison Mankin, Duane Wessels, and Paul Hoffman. 2016. Specification for DNS over transport layer security (TLS). IETF RFC7858, May (2016).

[30] Christian Huitema, Melinda Shore, Allison Mankin, Sara Dickinson, and Jana Iyengar. 2018. Specification of dns over dedicated quic connections. Internet Engineering Task Force, Internet-Draft draft-huitema-quic-dnsoquic-05 (2018).

[31] Ibrahim Issa, Sudeep Kamath, and Aaron B Wagner. 2016. An operational measure of information leakage. In 2016 Annual Conference on Information Science and Systems (CISS). IEEE, 334-339.

[32] Jawad Khalife, Amjad Hajjar, and Jesus Diaz-Verdejo. 2014. A multilevel taxonomy and requirements for an optimal traffic-classification model. International Journal of Network Management 24, 2 (2014), 101-120.

[33] Liaqat Ali Khan, Muhammad Shamim Baig, and Amr M Youssef. 2010. Speaker recognition from encrypted VoIP communications. digital investigation 7, 1-2 (2010), 65-73.

[34] Marc Liberatore and Brian Neil Levine. 2006. Inferring the source of encrypted HTTP connections. In Proceedings of the 13th ACM conference on Computer and communications security. ACM, 355-363.

[35] Gianluca Maiolini, Andrea Baiocchi, Alfonso Iacovazzi, and Antonello Rizzi. 2009. Real time identification of SSH encrypted application flows by using cluster analysis techniques. In International Conference on Research in Networking. Springer, 182-194.

[36] Alexander Mayrhofer. 2016. The edns (0) padding option. Request for Comments (RFC) 7830 (2016).

[37] Alexander Mayrhofer. 2018. Padding Policies for Extension Mechanisms for DNS (EDNS(0)). Internet Requests for Comments, IETF, RFC 8467 (2018).

[38] Brad Miller, Ling Huang, Anthony D Joseph, and J Doug Tygar. 2014. I know why you went to the clinic: Risks and realization of https traffic analysis. In International Symposium on Privacy Enhancing Technologies Symposium. Springer, 143-163.

[39] Katsiaryna Mirylenka, Vassilis Christophides, Themis Palpanas, Ioannis Pefkianakis, and Martin May. 2016. Characterizing home device usage from Wireless traffic time series.

[40] Paul Mockapetris et al. 1987. Domain names-implementation and specification. (1987).

[41] Baiju Muthukadan. 2018. Selenium with Python. https://selenium-python.readthedocs.io/. (2018).

[42] Milad Nasr, Alireza Bahramali, and Amir Houmansadr. 2018. Deepcorr: Strong flow correlation attacks on tor using deep learning. In Proceedings of the 2018 ACM SIGSAC Conference on Computer and Communications Security. 1962-1976.

[43] Manziba Akanda Nishi, Chowdhury Farhan Ahmed, Md Samiullah, and Byeong-Soo Jeong. 2013. Effective periodic pattern mining in time series databases. Expert Systems with Applications 40, 8 (2013), 3015-3027.

[44] Andriy Panchenko, Lukas Niessen, Andreas Zinnen, and Thomas Engel. 2011. Website fingerprinting in onion routing based anonymization networks. In Proceedings of the 10th annual ACM workshop on Privacy in the electronic society. ACM, 103-114.

[45] Roberto Peon and Herve Ruellan. 2015. HPACK: Header compression for HTTP/2. Internet Requests for Comments, RFC Editor, RFC 7541 (2015).

[46] Michael Rabbat, Robert Nowak, and Mark Coates. 2004. Multiple source, multiple destination network tomography. In IEEE INFOCOM 2004, Vol. 3. IEEE, 1628-1639.

[47] Roxana Radu and Michael Hausding. 2020. Consolidation in the DNS resolver market—how much, how fast, how dangerous? Journal of Cyber Policy 5, 1 (2020), 46-64.

[48] T Scott Saponas, Jonathan Lester, Carl Hartung, Sameer Agarwal, Tadayoshi Kohno, et al. 2007. Devices That Tell on You: Privacy Trends in Consumer Ubiquitous Computing. In USENIX Security Symposium. 55-70.

[49] Sandra Siby, Marc Juarez, Claudia Diaz, Narseo Vallina-Rodriguez, and Carmela Troncoso. 2020. Encrypted DNS—>Privacy. A Traffic Analysis Perspective (Proc. of the NDSS) (2020).

[50] Sandra Siby, Marc Juarez, Narseo Vallina-Rodriguez, and Carmela Troncoso. 2018. DNS Privacy not so private: the traffic analysis perspective. (2018).

[51] Dawn Song. 2001. Timing analysis of keystrokes and SSH timing attacks. In Proc. of 10th USENIX Security Symposium, 2001.

[52] Qixiang Sun, Daniel R Simon, Yi-Min Wang, Wilf Russell, Venkata N Padmanabhan, and Lili Qiu. 2002. Statistical identification of encrypted web browsing traffic. In Proceedings 2002 IEEE Symposium on Security and Privacy. IEEE, 19-30.

[53] Mahbod Tavallaee, Wei Lu, and Ali A Ghorbani. 2009. Online classification of network flows. In 2009 Seventh Annual Communication Networks and Services Research Conference. IEEE, 78-85.

[54] Luca Vassio, Idilio Drago, Marco Mellia, Zied Ben Houidi, and Mohamed Lamine Lamali. 2018. You, the web, and your device: Longitudinal characterization of browsing habits. ACM Transactions on the Web (TWEB) 12, 4 (2018), 1-30.

[55] Charles V Wright, Lucas Ballard, Scott E Coull, Fabian Monrose, and Gerald M Masson. 2008. Spot me if you can: Uncovering spoken phrases in encrypted VoIP conversations. In 2008 IEEE Symposium on Security and Privacy (sp 2008). IEEE, 35-49.

[56] Charles V Wright, Scott E Coull, and Fabian Monrose. 2009. Traffic Morphing: An Efficient Defense Against Statistical Traffic Analysis. In NDSS, Vol. 9. Citeseer.

[57] Fan Zhang, Wenbo He, Xue Liu, and Patrick G Bridges. 2011. Inferring users' online activities through traffic analysis. In Proceedings of the fourth ACM conference on Wireless network security. ACM, 59-70.

[58] Min Zhang, Wolfgang John, K C Claffy, and Nevil Brownlee. 2009. State of the art in traffic classification: A research review. In PAM Student Workshop. 3-4.

What is claimed is:

1. A system for traffic obfuscation of encrypted data packets, the system comprising:
one or more processors; and
memory having instructions stored thereon that, when executed by the one or more processors, cause the system to:
select an obfuscation interval duration for a next transmission of a data packet associated with an application or protocol;
determine if a queue for transmission of a next data packet associated with the application or protocol is at least one of: i) empty, or ii) has a next data packet associated with an application or protocol at the obfuscation interval duration; and
transmit: i) a length-adjusted next encrypted data packet associated with an application or protocol, or ii) an encrypted obfuscation data packet associated with an application or protocol based on the determination, wherein the transmitted length-adjusted encrypted next data packet associated with the application or protocol is generated using the next data packet and is adjusted in length with an obfuscation payload prior to encryption and subsequent transmission.

2. The system of claim 1, wherein the instructions further cause the system to:
adjust the next data packet in length with the obfuscation payload to produce a length-adjusted next data packet prior to the transmission of the length-adjusted encrypted next data packet; and
encrypt the length-adjusted next data packet to produce the length-adjusted encrypted next data packet.

3. The system of claim 1, wherein the instructions further cause the system to:
adjust the next data packet in length with the obfuscation payload to a standardized data packet length associated with the application or protocol to produce a length-adjusted next data packet prior to transmission of the length-adjusted encrypted next data packet; and
encrypt the length-adjusted next data packet to produce the length-adjusted encrypted next data packet.

4. The system of claim 3, wherein the length-adjusted next data packet includes an indicator of the length of the obfuscation payload.

5. The system of claim 1, wherein the obfuscation payload comprises a string of heterogenous encoded characters.

6. The system of claim 1, wherein the instructions further cause the system to generate the encrypted obfuscation data packet by:
selecting a payload from a set of candidate payloads;
generating an obfuscation data packet associated with the application or protocol using the selected payload;
adjusting the obfuscation data packet in length with a second obfuscation payload to produce a length adjusted obfuscation data packet; and
encrypting the length-adjusted obfuscation data packet to generate the encrypted obfuscation data packet.

7. The system of claim 6, wherein the length adjusted obfuscation data packet includes an indicator (e.g., a value or symbol) of the length of the second obfuscation payload.

8. The system of claim 6, wherein the second obfuscation payload comprises a string of heterogenous encoded characters.

9. The system of claim 1, wherein the transmission of the length-adjusted next encrypted data packet or the encrypted obfuscation data packet after a selected delay of the obfuscation interval duration provides obfuscation of length and timestamp of an encrypted data packet associated with the next data packet.

10. The system of claim 1, wherein the application or protocol is at least one of a DNS-over-HTTPS (DoH) protocol or a high-frequency trading application.

11. The system of claim 1, wherein the instructions for traffic obfuscation of encrypted data packets are a part of a browser, a browser add-on, or a computer application.

12. A method to obfuscate encrypted data packets from traffic analysis attacks, the method comprising:
executing, by a processing device, an application or protocol for receiving traffic associated with the application or protocol;
selecting, by the processing device, an obfuscation interval duration for a next transmission of a data packet associated with the application or protocol;
determining, by the processing device, at the obfuscation interval duration, if a queue for transmission of a next data packet associated with the application or protocol is at least one of: i) empty, or ii) has a next data packet associated with an application or protocol; and
transmitting, by the processing device, based on the determination, at least one of: i) a length-adjusted next encrypted data packet associated with an application or protocol, or ii) an encrypted obfuscation data packet associated with an application or protocol,
wherein the transmitted length-adjusted encrypted next data packet associated with the application or protocol is generated using the next data packet and is adjusted in length with an obfuscation payload prior to encryption and subsequent transmission.

13. The method of claim 12, further comprising: adjusting, by the processing device, prior to the transmission of the length-adjusted encrypted next data packet, the next data packet in length with the obfuscation payload to produce a length-adjusted next data packet; and encrypting, by the processing device, the length-adjusted next data packet to produce the length-adjusted encrypted next data packet.

14. The method of claim 12, further comprising generating, by the processing device, the encrypted obfuscation data packet by: selecting, by the processing device, a payload from a set of candidate payloads; generating, by the processing device, an obfuscation data packet associated with the application or protocol using the selected payload; adjusting, by the processing device, the obfuscation data packet in length with a second obfuscation payload to produce a length adjusted obfuscation data packet; and encrypting, by the processing device, the length-adjusted obfuscation data packet to generate the encrypted obfuscation data packet.

15. The method of claim 12, further comprising: receiving, by a second processor of a second computing device, the length-adjusted next encrypted data packet associated with an application or protocol; decrypting, by the second processor, the length-adjusted next encrypted data packet associated with an application or protocol to determine a decrypted payload; determining, by the second processor, at least one of: i) the decrypted payload is an obfuscation payload and ignore the payload, or ii) the decrypted payload is a real payload and removing the obfuscation payload from the decrypted payload, wherein the decrypted payload is serviced by the application or protocol.

16. The method of claim 12, wherein the method is used to obfuscate encrypted data packets in a DNS-over-HTTPS (DoH) protocol or in a high-frequency trading application.

17. A non-transitory computer readable medium having instructions stored thereon that, when executed by one or more processors, cause a device to:
select an obfuscation interval duration for a next transmission of a data packet associated with an application or protocol;
determine if a queue for transmission of a next data packet associated with the application or protocol is at least one of: i) empty, or ii) has a next data packet associated with an application or protocol at the obfuscation interval duration; and
transmit: i) a length-adjusted next encrypted data packet associated with an application or protocol, or ii) an encrypted obfuscation data packet associated with an application or protocol based on the determination,
wherein the transmitted length-adjusted encrypted next data packet associated with the application or protocol is generated using the next data packet and is adjusted in length with an obfuscation payload prior to encryption and subsequent transmission.

18. The computer readable medium of claim 17, wherein the instructions further cause the device to:
- adjust the next data packet in length with the obfuscation payload to produce a length-adjusted next data packet prior to the transmission of the length-adjusted encrypted next data packet; and
- encrypt the length-adjusted next data packet to produce the length-adjusted encrypted next data packet.

19. The computer readable medium of claim 17, wherein the instructions further cause the device to:
- adjust the next data packet in length with the obfuscation payload to a standardized data packet length associated with the application or protocol to produce a length-adjusted next data packet prior to transmission of the length-adjusted encrypted next data packet; and
- encrypt the length-adjusted next data packet to produce the length-adjusted encrypted next data packet.

20. The computer readable medium of claim 17, wherein the instructions further cause the device to generate the encrypted obfuscation data packet by:
- selecting a payload from a set of candidate payloads;
- generating an obfuscation data packet associated with the application or protocol using the selected payload;
- adjusting the obfuscation data packet in length with a second obfuscation payload to produce a length adjusted obfuscation data packet; and
- encrypting the length-adjusted obfuscation data packet to generate the encrypted obfuscation data packet.

* * * * *